(12) United States Patent
Fujii et al.

(10) Patent No.: US 8,961,674 B2
(45) Date of Patent: Feb. 24, 2015

(54) INKJET INK, INK CARTRIDGE CONTAINING THE INKJET INK, INKJET RECORDING APPARATUS USING THE INK CARTRIDGE, AND PRINT FORMED BY THE INKJET INK

(71) Applicants: Hidetoshi Fujii, Shizuoka (JP); Hiroshi Gotou, Shizuoka (JP)

(72) Inventors: Hidetoshi Fujii, Shizuoka (JP); Hiroshi Gotou, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/973,042

(22) Filed: Aug. 22, 2013

(65) Prior Publication Data
US 2014/0069295 A1 Mar. 13, 2014

(30) Foreign Application Priority Data

Sep. 7, 2012 (JP) ................................ 2012-197938

(51) Int. Cl.
C09D 11/02 (2014.01)
C09D 11/38 (2014.01)
B41J 2/175 (2006.01)
C09D 11/322 (2014.01)

(52) U.S. Cl.
CPC ............. C09D 11/38 (2013.01); B41J 2/17503 (2013.01); C09D 11/322 (2013.01)
USPC .................. 106/31.75; 106/31.43; 106/31.49; 106/31.58; 106/31.78; 106/31.86

(58) Field of Classification Search
CPC ....... C09D 11/30; C09D 11/322; C09D 11/38
USPC .......... 106/31.43, 31.49, 31.58, 31.75, 31.78, 106/31.86
See application file for complete search history.

(56) References Cited

U.S. PATENT DOCUMENTS

| 5,580,373 | A  * | 12/1996 | Lane et al. ................... 106/31.43 |
| 6,821,329 | B2 * | 11/2004 | Choy .......................... 106/31.58 |
| 7,517,073 | B2 * | 4/2009  | Nito et al. ..................... 347/100 |
| 7,641,722 | B2 * | 1/2010  | Lee et al. .................... 106/31.86 |
| 2007/0197685 | A1 | 8/2007 | Aruga et al. |
| 2008/0152877 | A1 * | 6/2008 | Mukai et al. ............... 428/195.1 |
| 2008/0233363 | A1 | 9/2008 | Goto |
| 2009/0043028 | A1 | 2/2009 | Matsuyama et al. |

(Continued)

FOREIGN PATENT DOCUMENTS

| JP | 9-176538 | 7/1997 |
| JP | 2003-206426 | 7/2003 |

(Continued)

Primary Examiner — Helene Klemanski
(74) Attorney, Agent, or Firm — Cooper & Dunham LLP

(57) ABSTRACT

An inkjet ink is provided. The inkjet ink includes water; a water-soluble organic material in an amount of from 40 to 50% by weight based on the total weight of the inkjet ink; and a colorant. The water-soluble organic material includes at least one of 1,3-dimethyl-2-imidazolidinone, β-methoxy-N, N-dimethylpropionamide, and 2-pyrrolidone in an amount of from 5 to 35% by weight based on the total weight of the inkjet ink, and further includes a compound having the following formula (1) in an amount of from 10 to 40% by weight based on the total weight of the inkjet ink.

$$R \left[ O-\underset{\underset{CH_3}{|}}{CH}-CH_2 \right]_n OH$$

7 Claims, 4 Drawing Sheets

(56) References Cited

U.S. PATENT DOCUMENTS

| | | |
|---|---|---|
| 2009/0098312 A1 | 4/2009 | Goto et al. |
| 2009/0114120 A1* | 5/2009 | McIntyre et al. .......... 106/31.65 |
| 2009/0176070 A1 | 7/2009 | Goto et al. |
| 2010/0196601 A1 | 8/2010 | Goto et al. |
| 2010/0196602 A1 | 8/2010 | Koyano et al. |
| 2010/0295891 A1 | 11/2010 | Goto et al. |
| 2011/0057981 A1 | 3/2011 | Aruga et al. |
| 2011/0164086 A1 | 7/2011 | Ggoto et al. |
| 2011/0234683 A1* | 9/2011 | Komatsu ......................... 347/20 |
| 2011/0292114 A1* | 12/2011 | Sao et al. .................. 106/31.58 |
| 2011/0310166 A1 | 12/2011 | Namba et al. |
| 2012/0098883 A1 | 4/2012 | Matsuyama et al. |
| 2012/0128949 A1* | 5/2012 | Goto ............................. 428/207 |
| 2012/0207983 A1 | 8/2012 | Matsuyama et al. |
| 2012/0262517 A1* | 10/2012 | Takaku et al. .................. 347/20 |
| 2012/0293582 A1 | 11/2012 | Goto et al. |
| 2012/0320137 A1 | 12/2012 | Fujii et al. |
| 2013/0002776 A1 | 1/2013 | Nagashima et al. |
| 2013/0065028 A1 | 3/2013 | Fujii et al. |
| 2013/0070017 A1 | 3/2013 | Fujii et al. |
| 2013/0071637 A1 | 3/2013 | Matsuyama et al. |
| 2013/0113860 A1 | 5/2013 | Gotou et al. |
| 2013/0155145 A1 | 6/2013 | Gotou et al. |
| 2013/0169724 A1* | 7/2013 | Gotou ........................... 347/100 |
| 2013/0176369 A1 | 7/2013 | Gotou et al. |
| 2013/0194343 A1 | 8/2013 | Yokohama et al. |
| 2013/0194344 A1 | 8/2013 | Yokohama et al. |
| 2013/0194345 A1 | 8/2013 | Tamai et al. |
| 2013/0321525 A1* | 12/2013 | Fujii et al. ....................... 347/21 |
| 2013/0323474 A1* | 12/2013 | Gotou et al. ............... 428/195.1 |

FOREIGN PATENT DOCUMENTS

| | | |
|---|---|---|
| JP | 2005-297549 | 10/2005 |
| JP | 2006-131797 | 5/2006 |
| JP | 2006-213922 | 8/2006 |
| JP | 2007-091905 | 4/2007 |
| JP | 2009-113494 | 5/2009 |
| JP | 2011-201063 | 10/2011 |
| JP | 2012-107210 | 6/2012 |

* cited by examiner

INKJET INK, INK CARTRIDGE CONTAINING THE INKJET INK, INKJET RECORDING APPARATUS USING THE INK CARTRIDGE, AND PRINT FORMED BY THE INKJET INK

CROSS-REFERENCE TO RELATED APPLICATIONS

This patent application is based on and claims priority pursuant to 35 U.S.C. §119 to Japanese Patent Application No. 2012-197938 filed on Sep. 7, 2012 in the Japan Patent Office, the entire disclosure of which is hereby incorporated by reference herein.

TECHNICAL FIELD

This disclosure relates to an inkjet ink. In addition, this disclosure relates to an ink cartridge containing the inkjet ink, and to an inkjet recording apparatus using the inkjet cartridge. Further, this disclosure relates to a print formed by the inkjet ink.

BACKGROUND

Inkjet recording methods have advantages over other image recording methods such that the process is simple; full color images can be produced relatively easily; and high resolution images can be produced even when an inkjet recording apparatus having a simple structure is used. Dye-based inks, in which a water soluble dye is dissolved in a medium such as water and mixture solvents of water and a wetting agent, have been typically used as inkjet inks.

Recently, there is an increasing need for high speed inkjet recording. When images are formed on a plain paper using an aqueous ink, serious problems such as a curling problem in that the resultant print is curled, and a cockling problem in that the resultant print is waved tend to be caused. This is because such an aqueous ink includes a large amount of water, and therefore water in the ink swells the fibers of recording papers, thereby often causing the curling problem and the cockling problem.

In contrast, oil-based inks do not include water, and therefore oil-based inks do not cause the curling problem and the cockling problem. However, oil-based inks have a greater penetration ability than aqueous inks, and therefore oil-based inks often cause serious problems concerning image qualities such that the resultant print has low image density; blurred images are formed; and an image penetrates deeply so as to reach the backside of a recording paper, thereby soiling the backside of the recording paper (hereinafter referred to as a backside soiling problem).

Namely, there is no inkjet ink which can produce images having good image qualities without causing the curling and cockling problems.

In attempting to solve the curling and cockling problems using an aqueous ink and a plain paper, a technique is proposed which uses, as a curl preventing agent, a specific compound such as saccharides, sugar alcohols, and amide compounds. However, when an image including a large amount of ink is formed at a high speed, the curling and cockling problems tend to be caused.

In addition, in attempting to solve the curling and cockling problems, JP-2005-297549-A discloses a method using an aqueous ink which includes a water-soluble organic compound in a relatively large amount. As a result of the present inventors' investigation, the ink disclosed in JP-2005-297549-A includes a water-soluble organic compound (solvent) in a relatively large amount, and therefor the low image density problem is caused like oil-based inks. In addition, the ink has a high viscosity, and therefore the ink has poor ejection property (i.e., the ejection reliability of the ink deteriorates).

In addition, in attempting to solve the curling and cockling problems, a technique of using a hydrophobic solvent in a large amount is studied. However, the curling and cockling preventing effect of the technique is not satisfactory.

Thus, there is no inkjet ink which can produce images having good image qualities without causing the curling and cockling problems.

JP-2012-107210-A proposes an ink including a polyalcohol having an equilibrium moisture content of not less than 30% by weight at 23° C. and 80% RH, and a specific amide compound (such as 1,3-dimethyl-2-imidazolidinone, β-methoxy-N,N-dimethylpropion amide, and 2-pyrrolidone). Using such an amide compound produces the curl preventing effect.

JP-2011-201063-A proposes a clear ink including a glycol ether (such as diisoprene glycol monoalkyl ether, and triisoprene glycol monoalkyl ether) in an amount of from 3 to 10% by weight. The ink does not include a colorant, and includes a water-soluble organic compound in a relatively small amount.

SUMMARY

The object of this application is to provide an inkjet ink which can produce images having good image qualities without causing the curling and cockling problems.

As an aspect of this disclosure, an inkjet ink is provided which includes at least water, a water-soluble organic material, and a colorant. The inkjet ink includes the water-soluble organic material in an amount of from 40 to 50% by weight based on the total weight of the inkjet ink. The water-soluble organic material includes at least one of 1,3-dimethyl-2-imidazolidinone, β-methoxy-N,N-dimethylpropioneamide, and 2-pyrrolidone in an amount of from 5 to 35% by weight based on the total weight of the inkjet ink. Further, the water-soluble organic material includes a compound having the following formula (1) in an amount of from 10 to 40% by weight based on the total weight of the inkjet ink.

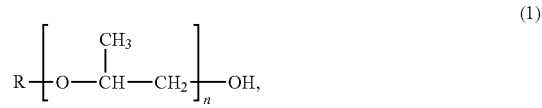

$$R-\left[O-\underset{|}{\overset{CH_3}{CH}}-CH_2\right]_n-OH, \quad (1)$$

wherein R represents a hydrogen atom, or an alkyl group having 1 to 3 carbon atoms, and n is an integer of from 2 to 7.

As another aspect of this disclosure, an ink cartridge is provided which includes a container, and the above-mentioned inkjet ink contained in the container.

As another aspect of this disclosure, an inkjet recording apparatus is provided which includes the above-mentioned ink cartridge; and an inkjet recording head to eject the inkjet ink contained in the ink cartridge to form an ink image on a recording medium.

As another aspect of this disclosure, a print is provided which includes a support, and an ink image of the above-mentioned inkjet ink located on the support.

The aforementioned and other aspects, features and advantages will become apparent upon consideration of the follow-

DETAILED DESCRIPTION

Figure 1:
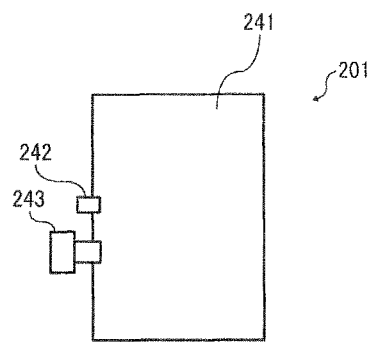
FIG. 1 is a schematic view illustrating an ink cartridge according to an embodiment.

This disclosure will be described in detail.

Initially, the inkjet ink of this disclosure will be described.

The inkjet ink (hereinafter referred to as an ink) of this disclosure includes at least water, a water-soluble organic material, and a colorant. In this regard, the water-soluble organic material is defined as an organic material, which can be dissolved in water serving as a dispersion medium of an ink at a temperature of from 15 to 35° C. Specific examples of such a water-soluble organic material include wetting agents, polymer compounds, surfactants, penetrants, antirusts, fungicides, dyes, etc., which are soluble in water. Organic pigments, inorganic pigments, resins, etc., which are insoluble in water, are not the water-soluble organic material.

Since the ink of this disclosure includes, as a water-soluble organic material, at least one of 1,3-dimethyl-2-imidazolidinone, β-methoxy-N,N-dimethylpropioneamide, and 2-pyrrolidone, the ink has a relatively low viscosity, and in addition, the ink can maintain good ejection stability even when the content of the water-soluble organic material in the ink is increased. Specifically, the total content of the above-mentioned three compounds in the ink is from 5 to 35% by weight, and preferably from 5 to 30% by weight. When the content is less than 5% by weight, the viscosity of the ink tends to increases, and the ejection stability of the ink tends to deteriorate. In contrast, when the content is greater than 35%, image qualities tend to deteriorate.

When the above-mentioned three organic compounds are included in the ink, the drying speed of the ink on a recording paper decreases because the compounds incorporate a large amount of water therein. Therefore, a pigment in the ink penetrates deeply into the recording paper, and the image density decreases.

As a result of the present inventors' investigation, it is found that by using an isopropyl glycol or an isopropyl ether, which has the following formula (1), together with one or more of the three organic compounds, the image density does not decrease (i.e., an image density improving effect can be produced) even when the content of the water-soluble organic material is high, and in addition, occurrence of the curling and cockling problems can be prevented.

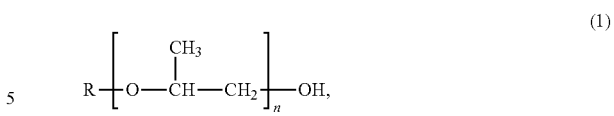

wherein R represents a hydrogen atom, or an alkyl group having 1 to 3 carbon atoms, and n is an integer of from 2 to 7.

The content of a water-soluble organic material having formula (1) in the ink is from 10 to 40% by weight based on the total weight of the ink. When the content is less than 10% by weight, the curl preventing effect is hardly produced. In contrast, when the content is greater than 40% by weight, the image density tends to decease.

The total content of the above-mentioned water-soluble materials and other water-soluble materials in the ink is from 40 to 50% by weight based on the total weight of the ink to produce high quality images while preventing occurrence of the curling problem. When the content is less than 40% by weight, the curl preventing effect is hardly produced. In contrast, when the content is greater than 50% by weight, the viscosity of the ink tends to increase, and the ejection stability of the ink tends to deteriorate.

In order to produce high quality images while preventing occurrence of the curling and cockling problems, is it preferable to adjust the content of a surfactant included in the ink to decrease the dynamic surface tension, and/or to add an isobutylene ether compound such as diethylene glycol monoisobutyl ether, and dipropylene glycol monoisobutyl ether to the ink. In particular, the dynamic surface tension of the ink, which is measured at 23° C. and at a time 15 ms after formation of bubbles, is preferably adjusted so as to be front 25 to 35 mN/m. When the dynamic surface tension falls in this range, the ink can produce high quality images while having a good combination of ejection stability and preservability.

Suitable materials for use as the wetting agent include water-soluble organic solvents and water-soluble organic solid materials, which can be dissolved in water and which have a function of retaining water in the ink and a function of improving the wettability of the ink.

Specific examples of the wetting agent include polyalcohols, polyalcohol alkyl ethers, polyalcohol aryl ethers, nitrogen-containing heterocyclic compounds, amides, amines, sulfur-containing compounds, propylene carbonate, and ethylene carbonate.

In particular, isopropyl glycols and isopropyl ethers, which have the above-mentioned formula (1), are preferable. Specific examples thereof include diisopropylene glycol monoisopropyl ether, triisopropylene glycol monomethyl ether, triisopropylene glycol monoethyl ether, triisopropylene glycol monoisopropyl ether, and polyisopropylene glycol, which have a molecular weight of from 130 to 500.

The content of such a wetting agent is from 10 to 40% by weight based on the total weight of the ink for the reason mentioned above with respect to the water-soluble organic material having formula (1).

Specific examples of the polyalcohols include ethylene glycol (boiling point of 196-198° C.), diethylene glycol (boiling point of 245° C.), triethylene glycol (boiling point of 285° C.), tetraethylene glycol (boiling point of 324-330° C.), polyethylene glycol (viscous liquid to solid), propylene glycol (boiling point of 187° C.), dipropylene glycol (boiling point of 232° C.), tripropylene glycol (boiling point of 267° C.), polypropylene glycol (viscous liquid to solid), 1,3-butanediol (boiling point of 203-204° C.), 2-methyl-1,3-butanediol (boiling point of 203° C.), 1,5-pentanediol (boiling point of 242° C.), 2-methyl-2,4-pentanediol (boiling point of 197° C.), hexylene glycol (boiling point of 197° C.), 1,6-hexanediol (boiling point of 253-260° C.), glycerin (boiling point of 290° C.), diglycerin (boiling point of 270° C./20 hPa), 1,2,3-butanetriol (boiling point of 175° C./33 hPa), 1,2,4-butanetriol (boiling point of 190-191° C./24 hPa), 1,2,6-hexanetriol (boiling point of 178° C.), isopropyl glycol (boiling point of 142° C.), diethyl diglycol (boiling point of 189° C.), isobutyl diglycol (boiling point of 220° C.), propylpropylene glycol (boiling point of 150° C.), propylpropylene diglycol (boiling point of 220° C.), butylpropylene glycol (boiling point of 170° C.), butylpropylene diglycol (boiling point of 212° C.), 2-(2-isopropyloxyethoxy)ethanol (boiling point of 207° C.), and methylpropylene glycol acetate (boiling point of 146° C.). Among these polyalcohols, glycerin and 1,3-butanediol are preferable because when the compounds include water, the liquids have a low viscosity.

Specific examples of the polyalcohol alkyl ethers include ethylene glycol monoethyl ether (boiling point of 135° C.), ethylene glycol monobutyl ether (boiling point of 171° C.), diethylene glycol monomethyl ether (boiling point of 194° C.), diethylene glycol monoethyl ether (boiling point of 197° C.), diethylene glycol monobutyl ether (boiling point of 231° C.), ethylene glycol mono-2-ethylhexyl ether (boiling point of 229° C.), propylene glycol monoethyl ether (boiling point of 132° C.), triethylene glycol dimethyl ether (boiling point of 216° C.), and tripropylene glycol monomethyl ether (boiling point of 242° C.).

Specific examples of the polyalcohol aryl ethers include ethylene glycol monophenyl ether (boiling point of 237° C.), and ethylene glycol monobenzyl ether.

Specific examples of the nitrogen-containing heterocyclic compounds include 2-pyrrolidone (having boiling point of 250° C., melting point of 25.5° C., and equilibrium moisture content of 47-48% by weight), N-methyl-2-pyrrolidone (boiling point of 202° C.), 1,3-dimethyl-2-imidazolidinone (boiling point of 226° C.), ε-caprolactam (boiling point of 270° C.), and γ-butyrolactone (boiling point of 204-205° C.).

Specific examples of the amides include formamide (boiling point of 210° C.), N-methylformamide (boiling point of 199-201° C.), N,N-dimethylformamide (boiling point of 153° C.), and N,N-diethylformamide (boiling point of 176-177° C.).

Specific examples of the amines include monoethanolamine (boiling point of 170° C.), diethanolamine (boiling point of 268° C.), triethanolamine (boiling point of 360° C.), N-methylethanolamine (boiling point of 159° C.), N-methyldiethanolamine (boiling point of 243° C.), N,N-dimethylmonoethanolamine (boiling point of 139° C.), N-phethylethanolamine (boiling point of 282-287° C.), and 3-aminopropyldiethylamine (boiling point of 169° C.).

Specific examples of the sulfur-containing compounds include dimethylsulfoxide (boiling point of 139° C.), sulfolane (boiling point of 285° C.), and thiodiglycol (boiling point of 282° C.).

Solid wetting agents such as saccharide can also be used. Examples of saccharide include monosaccharide, disaccharide, oligosaccharide (including tri- and tetra-saccharide), and polysaccharide.

Specific examples thereof include glucose, mannose, fructose, ribose, xylose, arabinose, galactose, maltose, cellobiose, lactose, sucrose, trehalose, and maltotriose.

In this application, polysaccharide means saccharide in a broad sense, and includes materials present in nature such as α-cyclodextrin, and cellulose.

Not only the saccharide mentioned above but also derivatives thereof can be used. Specific examples of such derivatives include reduction materials of the saccharide mentioned above (e.g., sugar alcohols (having formula $HOCH_2(CHOH)_nCH_2OH$, wherein n is an integer of from 2 to 5)), and oxidation materials of the saccharide mentioned above (e.g., aldonic acid, and uronic acid), amino acids, and thio acids.

Among these materials, sugar alcohols are preferable. Specific examples of such sugar alcohols include maltitol, and sorbit.

Dyes and pigments are used as the colorant of the ink.

Suitable materials for use as the pigments include organic pigments such as azo pigments, phthalocyanine pigments, anthraquinone pigments, dioxazine pigments, indigo pigments, thioindigo pigments, perylene pigments, isoindolinone pigments, aniline black, azomethine pigments, and Rhodamine B Lake pigments; and inorganic pigments such as carbon black, iron oxide, titanium oxide, calcium carbonate, barium sulfate, aluminum hydroxide, barium yellow, Prussian blue, cadmium red, chrome yellow, and metal powders.

Specific examples of black color pigments include carbon blacks (i.e., C.I. Pigment Black 7) such as furnace black, lamp black, acetylene black, and channel black; powders of metal oxides such as copper oxide, iron oxide (i.e., C.I. Pigment Black 11), and titanium oxide; and organic pigments such as Aniline Black (i.e., C.I. Pigment Black 1). Specific examples of yellow color pigments include C.I. Pigment Yellows 1 (Fast Yellow G), 2, 3, 12 (Disazo yellow AAA), 13, 14, 16, 17, 20, 23, 24, 34, 35, 37, 42, (yellow iron oxide), 53, 55, 73, 74, 75, 81, 83 (Disazo yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180 and 185.

Specific examples of magenta color pigments include C.I. Pigment Violet 19; and C.I. Pigment Reds 1, 2, 3, 5, 7, 9, 12, 17, 22 (Brilliant Fast Scarlet), 23, 31, 38, 48:1 (Permanent Red 2B(Ba)), 48:2 (Permanent Red 2B(Ca)), 48:3 (Permanent Red 2B(Sr)), 48:4 (Permanent Red 2B(Mn)), 49:1, 52:2, 53:1, 57:1 (Brilliant Carmine 6B), 60:1, 63:1, 63:2, 64:1, 81 (Rhodamine 6G Lake), 83, 88, 92, 97, 101 (red iron oxide), 104, 105, 106, 108 (cadmium red), 112, 114, 122 (dimethyl quinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255 and 272.

Specific examples of cyan color pigments include C.I. Pigment Blues 1, 2, 3, 15 (copper Phthalocyanine Blue R), 15:1, 15:2, 15:3 (phthalocyanine Blue 0), 15:4, 15:6 (Phthalocyanine Blue E), 16, 17:1, 22, 56, 60, 63 and 64, and Vat Blues 4 and 60.

Specific examples of intermediate color pigments (such as red, green and blue pigments) include C.I. Pigment Reds 177, 194 and 224, C.I. Pigment Oranges 16, 36, 43, 51, 55, 59, 61 and 71, C.I. Pigment Violets 3, 19, 23, 29, 30, 37, 40 and 50, and C.I. Pigment Greens 7 and 36.

Among the above-mentioned black pigments, carbon blacks are preferable. Among carbon blacks, furnace and channel carbon blacks having a primary particle diameter of from 15 to 40 nm, a BET specific surface area of from 50 to 300 m²/g, a DBP (dibutyl phthalate) oil absorption of from 40 to 150 ml/100 g, a volatile content of from 0.5 to 10% by weight, and a pH of from 2 to 9 are preferable. Acidic carbon blacks having a pH of not greater than 6 are more preferable because of producing high density images.

Among the above-mentioned color pigments, Pigment Yellows 13, 17, 55, 74, 93, 97, 98, 110, 128, 139, 147, 150, 151, 154, 155, 180 and 185, Pigment reds 122, 202 and 209, Pigment Violet 19, and Pigment Blues 15:3 and 15:4 are preferable.

The volume average particle diameter of the pigment to be included in the ink preferably from 20 to 200 nm, more preferably from 30 to 150 nm, and even more preferably from 50 to 100 nm. When the volume average particle diameter is not greater than 200 nm, problems such that the chroma of ink images deteriorates; and the viscosity of the ink increases due to agglomeration when the ink is preserved, and a nozzle clogging problem in that nozzles ejecting the ink are clogged with the ink are not caused. In addition, when the volume average particle diameter is not less than 20 nm, problems such that the light resistance of the pigments deteriorates; and the preservation stability of the ink deteriorates are not caused.

The volume average particle diameter (D50) of a pigment is measured with an instrument, MICRO TRACK UPA-150 from Nikkiso Co., Ltd. When measuring the volume average particle diameter (i.e., a 50% average particle diameter D50) of a pigment, the pigment is dispersed in pure water at a concentration of 0.01% by weight, and the measurements are performed under the following conditions.

Refractive index of particle: 1.51
Density of particle: 1.4 g/cm$^3$
Solvent parameter: Pure water parameter
Temperature: 23° C.

The pigment content of the ink is preferably from 2 to 15% by weight, more preferably from 3 to 12% by weight, and even more preferably from 4 to 10% by weight. When the pigment content is not less than 2% by weight, clear and high density images can be produced. When the pigment content is not greater than 15% by weight, problems such that the preservation stability of the ink deteriorates; and dull-colored images are formed are not caused.

When a pigment ink is used, the ink typically includes a dispersant. Nonionic surfactant or anionic surfactants are typically used while properly selected depending on choice of pigment and formulation of the ink.

Specific examples of such nonionic surfactants include polyoxyethylene alkyl ethers such as polyoxyethylene lauryl ether, polyoxyethylene myristyl ether, polyoxyethylene cetyl ether, polyoxyethylene stearyl ether, and polyoxyethylene oleyl ether; polyoxyethylene alkylphenyl ethers such as polyoxyethylene octylphenyl ether, and polyoxyethylene nonylphenyl ether; polyoxyethylene α-naphthyl ether, polyoxyethylene β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, polyoxyethylene distyrylnaphthyl ether, and polyoxyethylene-polyoxypropylene block copolymers. In addition, surfactants in which part of the polyoxyethylene group of these surfactants is replaced with a polyoxypropylene group; and surfactants prepared by subjecting surfactants having an aromatic ring such as polyoxyethylene alkylphenyl ether to condensation using formalin can also be used.

Among nonionic surfactants, nonionic surfactants having a HLB of from 12 to 19.5, and preferably from 13 to 19 are preferable. When the HLB is not lower than 12, a problem in that the affinity of the surfactant for a dispersing medium deteriorates, resulting in deterioration of stability of the pigment dispersed in the ink is not caused. In addition, when the HLB is not higher than 19.5, a problem in that the surfactant is not easily adsorbed on a pigment, resulting in deterioration of stability of the pigment dispersed in the ink is not caused.

Specific examples of the anionic surfactants include polyoxyethylene alkyl ether sulfuric acid salts, polyoxyethylene alkylphenyl ether sulfuric acid salts, polyoxyethylene monostyrylphenyl ether sulfuric acid salts, polyoxyethylene distyrylphenyl ether sulfuric acid salts, polyoxyethylene alkyl ether phosphoric acid salts, polyoxyethylene alkylphenyl ether phosphoric acid salts, polyoxyethylene monostyrylphenyl ether phosphoric acid salts, polyoxyethylene distyrylphenyl ether phosphoric acid salts, polyoxyethylene alkyl ether carboxylic acid salts, polyoxyethylene alkylphenyl ether carboxylic acid salts, polyoxyethylene monostyrylphenyl ether carboxylic acid salts, polyoxyethylene distyrylphenyl ether carboxylic acid salts, formalin condensation products of naphthalene sulfonic acid salts, formalin condensation products of melamine sulfonic acid salts, salts of dialkyl sulfosuccinic acid esters, di-salts of alkyl sulfosuccinate, di-salts of polyoxyethylene alkylsulfosuccinate, alkyl sulfoacetic acid salts, α-olefin sulfonic acid salts, alkylbenzene sulfonic acid salts, alkylnaphthalene sulfonic acid salts, alkylsulfonic acid salts, N-acylamino acid salts, acylated peptides, and soaps. Among these anionic surfactants, sulfates or phosphates of polyoxyethylene alkyl ethers, polyoxyethylen alkylphenyl ethers, and polyoxyethylene distyrylphenyl ether are particularly preferable.

The added amount of such a surfactant is preferably from 10 to 50% by weight based on the weight of the pigment included in the ink. When the added amount is not less than 10% by weight, problems such that the preservation stability of the pigment dispersion and the ink deteriorates; and it takes a time to disperse a pigment are not caused. When the added amount is not greater than 50% by weight, a problem in that the viscosity of the ink seriously increases, thereby deteriorating the ejection stability of the ink is not caused.

Self-dispersible pigments which can be dispersed without using a dispersant and in which a hydrophilic group is bonded with the surface of the pigments directly or with another group therebetween to modify the surface are preferably used as the colorant. When performing the surface modification, a method in which a specific functional group (such as sulfonic group and carboxylic group) is chemically bonded with the surface of a pigment, or a method in which a pigment is subjected to a wet oxidation treatment using hypohalous acid or salts thereof can be used. Among these self-dispersible pigments, pigments whose surfaces are bonded with a carboxyl group and which are dispersed in water are preferable. When a pigment is subjected to surface modification so as to have a carboxyl group, not only the dispersion stability of the pigment is enhanced, but also high quality images can be produced, and in addition the water resistance of ink images can be enhanced.

Among such self-dispersible pigments, self-dispersible pigments (such as carbon blacks) having ionicity are preferable, and anionically-charged self-dispersible carbon blacks having a hydrophilic anionic group are particularly preferable.

Specific examples of such hydrophilic anionic groups include groups such as —COOM, —SO$_3$M, —PO$_3$HM, —PO$_3$M$_2$, —SO$_2$NH$_2$, and —SO$_2$NHCOR, wherein M represents an alkali metal ion, an ammonium group, or an organic ammonium group, and R represents an alkyl group having 1 to 12 carbon atoms, a substituted or unsubstituted phenyl group, or a substituted or unsubstituted naphthyl group. Among these hydrophilic anionic groups, —COOM, and —SO$_3$M are preferable. Specific examples of the alkali metal include lithium, sodium and potassium. Specific examples of the organic ammonium group include mono- to tri-methylammonium groups, mono- to tri-ethylammonium groups, and mono- to tri-methanolammonium groups.

Specific examples of the method for incorporating a —COONa group into the surface of a color pigment include a method in which a color pigment is subjected to an oxidation treatment using sodium hypochlorite, a method in which a pigment is sulfonated, and a method in which a color pigment is reacted with a diazonium salt.

The above-mentioned hydrophilic groups can be bonded with the surface of a pigment with another group therebetween. Specific examples of such intervening groups include alkyl groups having 1 to 12 carbon atoms, substituted or unsubstituted phenyl groups, and substituted or unsubstituted naphthyl groups, wherein specific examples of the substituent groups include —$C_2H_4$COOM (M represents an alkali metal or a quaternary ammonium group), -Ph$SO_3$M (Ph represents a phenyl group, and M represents an alkali metal or a quaternary ammonium group), etc.

In addition to the above-mentioned pigments, polymer emulsions in which a colorant included in a particulate polymer is dispersed are preferably used as the colorant of the ink. In this regard, the state in which a pigment is included in a particulate polymer means a state in which a pigment is encapsulated in a particulate polymer and/or a state in which a pigment is adsorbed on a surface of a particulate polymer. In this regard, all of particles of the pigment is not necessarily included in the particulate polymer or adsorbed on the particulate polymer, and part of the pigment may be dispersed in the resultant emulsion as long as the effect of the pigment is not deteriorated.

Suitable materials for use as the polymer of the above-mentioned polymer emulsion include vinyl polymers, polyester polymers, and polyurethane polymers. Among these polymers, vinyl polymers, and polyester polymers are preferable. Specific examples thereof include the polymers disclosed in JP-2000-53897-A, and JP-2001-139849-A.

Suitable materials for use as the dye serving as a colorant in the ink include dyes which fall in the categories of acidic dyes, direct dyes, basic dyes, reactive dyes, and food dyes in Color Index and which have a good combination of water resistance and light resistance. These dyes can be used in combination. In addition, the dyes can be used in combination of another colorant such as pigments. In this regard, such a colorant as used in combination with the dyes is added in an amount such that the effect of the ink is not deteriorated thereby.

Specific examples of the dyes include the following dyes (a) to (d).

(a) Acidic Dyes and Food Dyes
C.I. Acid Yellows 17, 23, 42, 44, 79 and 142.
C.I. Acid Reds 1, 8, 13, 14, 18, 26, 27, 35, 37, 42, 52, 82, 87, 89, 92, 97, 106, 111, 114, 115, 134, 186, 249, 254 and 289.
C.I. Acid Blues 9, 29, 45, 92 and 249.
C.I. Acid Blacks 1, 2, 7, 24, 26 and 94.
C.I. Food Yellows 3 and 4.
C.I. Food Reds 7, 9 and 14.
C.I. Food Black 1 and 2.
(b) Direct Dyes
C.I. Direct Yellows 1, 12, 24, 26, 33, 44, 50, 86, 120, 132, 142 and 144.
C.I. Direct Reds 1, 4, 9, 13, 17, 20, 28, 31, 39, 80, 81, 83, 89, 225 and 227.
C.I. Direct Oranges 26, 29, 62 and 102.
C.I. Direct Blues 1, 2, 6, 15, 22, 25, 71, 76, 79, 86, 87, 90, 98, 163, 165, 199 and 202.
C.I. Direct Blacks 19, 22, 32, 38, 51, 56, 71, 74, 75, 77, 154, 168 and 171.
(c) Basic Dyes
C.I. Basic Yellows 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91.
C.I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112.
C.I. Basic Blues 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155.
C.I. Basic Blacks 2 and 8.
(d) Reactive Dyes
C.I. Reactive blacks 3, 4, 7, 11, 12 and 17.
C.I. Reactive Yellows 1, 5, 11, 13, 14, 20, 21, 22, 25, 40, 47, 51, 55, 65 and 67.
C.I. Reactive Reds 1, 14, 17, 25, 26, 32, 37, 44, 46, 55, 60, 66, 74, 79, 96 and 97.
C.I. Reactive Blues 1, 2, 7, 14, 15, 23, 32, 35, 38, 41, 63, 80 and 95.

The ink preferably includes a resin emulsion to enhance the rub resistance of ink images and to enhance the preservation stability of the ink when a pigment is used as the colorant. In order to enhance the rub resistance, emulsions of acrylic resin, styrene-acrylic resins, acrylic-silicone resins, and fluorine-containing resins are preferably used. In order to enhance the preservation stability, emulsions of polyurethane, acrylic resins, and styrene-acrylic resins are preferably used. Since it is hard to impart a good combination of rub resistance and preservation stability to the ink using one resin emulsion, it is possible to use two or more kinds of resin emulsions. Marketed products of such resin emulsions can be used while properly selected.

Typical examples of such resin emulsions are as follows.
(1) Urethane Resin Emulsions Urethane resins of urethane resin emulsions are prepared by polymerizing a polyisocyanate and a polyol such as polyether polyol, polyester polyol, polylactone polyol and polycarbonate polyol.

Specific examples of the polyisocyanate include aliphatic diisocyanate compounds such as hexamethylene diisocyanate, and 2,2,4-trimethylhexamethylene diisocyanate; alicyclic diisocyanate compounds such as isophorone diisocyanate, hydrogenated xylylene diisocyanate, 1,4-cyclohexane diisocyanate, and 4,4'-dicyclohexylmethane diisocyanate; aromatic diisocyanate such as xylylene diisocyanate, tetramethylxylene diisocyanate, tolylene diisocyanate, and phenylmethane diisocyanate; and modified compounds of such diisocyanate compounds (such as carbodiimide-, urethodione- or urethoimine-modified compounds).

Specific examples of the polyether polyols include polyethylene glycol, polypropylene polytetramethylene ether glycol, and polyhexamethylene ether glycol.

Specific examples of the polyester polyols include polyethylene adipate, polybutylene adipate, polyneopentyl adipate, poly-3-methylpentyl adipate, polyethylene/butylene adipate, and polyneopentyl/hexyl adipate.

Specific examples of the polylactone polyols include polycaprolactone diol, and polyomegahydroxycaproic acid polyol.

Specific examples of the polycarbonate polyols include reaction products obtained by reacting a diol such as 3-propanediol, 1,4-butanediol, 1,6-hexanediol, diethylene glycol, methylene glycol, and tetraethylene glycol, phosgene, and diaryl carbonate (such as diphenyl carbonate) or a cyclic carbonate (such as ethylene carbonate and propylene carbonate).
(2) Acrylic Resin Emulsions Acrylic resins of acrylic resin emulsions are prepared by polymerizing an acrylic monomer alone or copolymerizing an acrylic monomer with another monomer.

Specific examples of the acrylic monomer include methyl acrylate, ethyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, hexyl acrylate, 2-ethylhexyl acrylate, cyclohexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, 3-(methyl)butyl methacrylate, hexyl methacrylate, 2-ethylhexyl methacrylate, octyl methacrylate, nonyl methacrylate, decyl methacrylate, undecyl methacrylate, dodecyl methacrylate, acrylic acid, methacrylic acid, acrylamide, methacrylamide, acrylonitrile, and methacrylonitrile.

Specific examples of other monomers include vinyl-type aromatic hydrocarbons such as styrene, o-methylstyrene, m-methylstyrene, p-methylstyrene, α-methylstyrene, p-ethylstyrene, 2,4-dimethylstyrene, p-tert-butylstyrene, p-chlorostyrene and divinylbenzene; unsaturated carboxylic acids such as itaconic acid, and maleic acid; N-substituted maleimide, maleic anhydride, vinyl ketone, vinyl acetate, and vinylidene chloride.

By incorporating an ionic group into the resin of such a resin emulsion, the resin can be dispersed in water more satisfactorily. Specific examples of such an ionic group include a sulfonic acid group, a carboxylic acid group, a sulfuric acid group, a phosphoric acid group, a phosphonic acid group, a phosphine acid group, and alkali metal salts, alkali earth metal salts, ammonium salts, and primary to tertiary amine salts of these acid groups. Among these ionic groups, alkali metal salts of carboxylic acids, ammonium salts of carboxylic acids, alkali metal salts of sulfonic acids, and ammonium salts of sulfonic acids are preferable, and alkali metal salts of sulfonic acids, and ammonium salts of sulfonic acids are particularly preferable because the resultant resin emulsion can be stably dispersed in water. An ionic group is typically incorporated by using a monomer having an ionic group when synthesizing a resin. Among the salts, Li, K and Na salts are preferable.

The ink can include a surfactant, which does not mean the above-mentioned surfactant for use in dispersing a pigment and which is directly added to the ink. Suitable materials for use as the surfactant include anionic surfactants, nonionic surfactants, fluorine-containing surfactants, and silicone surfactants, which have a low static surface tension and a good combination of penetrating property and leveling property and which do not deteriorate dispersion stability of the pigment used. Among these surfactants, fluorine-containing surfactants, and silicone surfactants are particularly preferable.

These surfactants can be used alone or in combination.

Among the fluorine-containing surfactants, surfactants in which the number of carbon atoms connected with a fluorine atom is from 2 to 16, and preferably from 4 to 16, are preferable. When the number of carbon atoms connected with a fluorine atom is not less than 2, the effect of fluorine can be produced. When the number is not greater than 16, a problem in that the preservability of the ink deteriorates is not caused.

Suitable materials for use as the fluorine-containing surfactant include perfluoroalkylsulfonic acid compounds, perfluoroalkylcarboxylic acid compounds, perfluoroalkylphospholic acid ester compounds, perfluoroalkylethylene oxide adducts, and polyoxyalkylene ether polymer compounds having a perfluoroalkyl ether group in a side chain thereof. Among these compounds, polyoxyalkylene ether polymer compounds having a perfluoroalkyl ether group in a side chain thereof are preferable because of having small foaming ability.

In particular, fluorine-containing surfactants having the following formula are preferable.

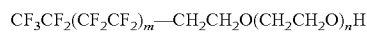

$$CF_3CF_2(CF_2CF_2)_m\text{—}CH_2CH_2O(CH_2CH_2O)_nH$$

wherein each of m and n is 0 or a positive integer.

In order that the fluorine-containing surfactants have good water solubility, m is preferably 0 or an integer of from 1 to 10, and n is preferably 0 or an integer of from 1 to 40.

Specific examples of the perfluoroalkylsulfonic acid compounds include perfluoroalkylsulfonic acids, and perfluoroalkylsulfonic acid salts.

Specific examples of the perfluoroalkylcarboxylic acid compounds include perfluoroalkylcarboxylic acids, and perfluoroalkylcarboxylic acid salts.

Specific examples of the perfluoroalkylphospholic acid ester compounds include perfluoroalkylphospholic acid esters, and salts of perfluoroalkylphospholic acid esters.

Specific examples of the polyoxyalkylene ether polymer compounds having a perfluoroalkyl ether group in a side chain thereof include polyoxyalkylene ether polymers, salts of polyoxyalkylene ether polymers, and sulfuric acid esters of polyoxyalkylene ether polymers, which have a perfluoroalkyl ether group in a side chain thereof.

Specific examples of the counter ion of such fluorine containing surfactants include Li, Na, K, $NH_4$, $NH_3CH_2CH_2OH$, $NH_2(CH_2CH_2OH)_2$, and $NH(CH_2CH_2OH)_3$.

Fluorine-containing compounds having one of the following formulae (2) to (7) are preferably used.

(1) Anionic Fluorine-Containing Surfactants

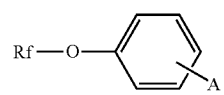

(2)

In formula (2), Rf represent a group having the following formula (A) or (B).

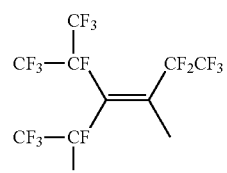

(A)

(B)

In formula (2), A represents a group having one of the following formulae.

$-SO_3X$, $-COOX$, and $-PO_3X$, wherein X represents a counter anion such as H, Li, Na, K, $NH_4$, $NH_3CH_2CH_2OH$, $NH_2(CH_2CH_2OH)_2$, and $NH(CH_2CH_2OH)_3$.

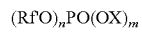

$(RfO)_nPO(OX)_m$ (3)

In formula (3), X is defined above in formula (2), n is 1 or 2, m is an integer of 2-n, and Rf' represents a group having the following formula (C).

$$F(CF_2CF_2)_nCH_2CH_2— \quad (C)$$

wherein n is an integer of from 3 to 10.

$$Rf'SCH_2CH_2COOX \quad (4)$$

In formula (4), X is defined above in formula (2), and Rf' is defined above in formula (3).

$$Rf'SO_3X \quad (5)$$

In formula (5), X is defined above in formula (2), and Rf' is defined above in formula (3).

(2) Nonionic Fluorine-Containing Surfactants $$RfO(CH_2CH_2O)_nH \quad (6)$$

wherein Rf is defined above in formula (2), and n is an integer of from 5 to 20.

$$Rf'O(CH_2CH_2O)_nH \quad (7)$$

wherein Rf' is defined above in formula (3), and n is an integer of from 1 to 40.

Synthesized or marketed fluorine-containing surfactants can be used. Specific examples of such marketed fluorine-containing surfactants include SARFRONs S-111, S-112, S-113, S-121, S-131, S-132, S-141 and S-145, which are manufactured by Asahi Glass Co., Ltd.; FLUORADs FC-93, FC-95, FC-98, FC-129, FC-135, FC-170C, FC-430 and FC-431, which are manufactured by Sumitomo 3M Ltd.; MEGAFACEs F-470, F-1405 and F-474, which are manufactured by DIC Corp.; ZONYLs TBS, FSP, FSA, FSN-100, FSN, FSO-100, FSO, FS-300 and UR, which are manufactured by Du Pont; FT-110, FT-250, FT-251, FT-400S, FT-150 and FT-400SW, which are manufactured by Neos Co., Ltd.; and POLYFOX PF-151N, which is manufactured by Om Nova Solutions, Inc.

Among these products, FS-300 (Du Pont); FT-110, FT-250, FT-251, FT-400S, FT-150, and FT-400SW (Neos Co., Ltd.); and POLYFOX PF-151N (Om Nova Solutions, Inc.) are preferable because images formed by the ink have good image qualities, particularly, recorded images have good coloring property, and good color evenness on recording papers.

The silicone surfactant mentioned above is not particularly limited. Suitable materials for use as the silicone surfactant include polydimethylsiloxane whose side chains are modified, polydimethylsiloxane whose both ends are modified, polydimethylsiloxane whose one end is modified, and polydimethylsiloxane whose both ends and side chains are modified. Among these surfactants, polyether-modified silicone surfactants having a polyoxyethylene group, or a polyoxyethylenepolyoxypropylene group are preferable because of exhibiting good properties as surfactants.

Synthesized silicone surfactants or marketed products can be used as the silicone surfactant. For example, marketed products can be available from BYK Chemie GmbH, Shin-Etsu Chemical Co., Ltd., Dow Corning Toray Silicone Co., Ltd., Nihon Emulsion, and Kyoeisha Chemical Co., Ltd.

The above-mentioned polyether-modified silicone surfactant is not particularly limited. For example, compounds in which a polyalkyleneoxide structure is incorporated into a side chain connected with a Si atom of a dimethylpolysiloxane chain and which have the following formula (8) can be used.

$$H_3C-\underset{\underset{CH_3}{|}}{\overset{\overset{CH_3}{|}}{Si}}-O{\left[\underset{\underset{CH_3}{|}}{\overset{\overset{CH_3}{|}}{Si}}-O\right]}_m{\left[\underset{\underset{X}{|}}{\overset{\overset{CH_3}{|}}{Si}}-O\right]}_n\underset{\underset{CH_3}{|}}{\overset{\overset{CH_3}{|}}{Si}}-CH_3 \quad (8)$$

$$X = \text{———}R(C_2H_4O)_a(C_3H_6O)_bR'$$

wherein each of m, n, a and b is independently an integer, and R and R' respectively represents an alkylene group and an alkyl group.

Marketed products can be used for the above-mentioned polyether-modified silicone surfactants. Specific examples of the marketed products include KF-618, KF-642, and KF-643, which are manufactured by Shin-Etsu Chemical Co., Ltd.; EMALEXs SS-5602 and SS-1906EX, which are manufactured by Nihon Emulsion Co., Ltd.; FZ-2105, FZ-2118, FZ-2154, FZ-2161, FZ-2162, FZ-2163 and FZ-2164, which are manufactured by Dow Corning Toray Silicone Co., Ltd.; and BYK-33 and BYK-387, which are manufactured by BYK Chemie GmbH.

Specific examples of the above-mentioned anionic surfactants include polyoxyethylene alkyl ether acetic acid salts, alkylbenzene sulfonic acid salts, lauric acid salts, and salts of polyoxyethylene alkyl ether sulfates.

Specific examples of the above-mentioned nonionic surfactants include polyoxyethylene alkyl ethers, polyoxypropylenepolyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides.

The content of such a surfactant in the ink is preferably from 0.01 to 3% by weight, and more preferably from 0.5 to 2% by weight, based on the total weight of the ink. When the content is not less than 0.01% by weight, the effect of the surfactant can be satisfactorily produced. When the content is not greater than 3% by weight, a problem such that the ink excessively penetrates into a recording medium (such as paper), thereby decreasing the image density or soiling the backside of the recording medium is not caused.

The ink preferably includes, as a penetrant, at least one of polyol compounds or glycol ether compounds, which have 8 to 11 carbon atoms.

Among these compounds, compound having a water solubility of from 0.2% to 5.0% by weight at 25° C. are preferable. Particularly, 2-ethyl-1,3-hexanediol (solubility of 4.2% by weight at 25° C.), and 2,2,4-trimethyl-1,3-pentanediol (solubility of 2.0% by weight at 25° C.) are preferable.

Specific examples of other polyol compounds include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

Other penetrants can be used in combination with the above-mentioned penetrants as long as the penetrants can be dissolved in the ink, and the properties of the ink can be controlled so as to fall in the desired ranges. Specific examples thereof include alkyl or aryl ethers of polyalcohols such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; and lower alcohols such as ethanol.

The content of a penetrant in the ink is from 0.1 to 4.0% by weight based on the weight of the ink. When the content is not lower than 0.1% by weight, a problem such that an image formed by the ink is not quickly dried, resulting in formation of a blurred image is not caused. When the content is not greater than 4.0% by weight, problems such that the dispersion stability of the colorant in the ink deteriorates, thereby causing the nozzle clogging problem; and the ink excessively penetrates into recording medium (such as paper), thereby decreasing the image density or soiling the backside of the recording medium are not caused.

The ink can optionally include other components such as pH controlling agents, antiseptics/fungicides, antirusts and chelating agents.

The pH controlling agent is added so that the ink has an alkaline pH. In this case, the ink is stable as a dispersion, and can be ejected stably from an inkjet recording head. When the pH of the ink is not less than 11, the ink tends to easily dissolve recording heads and ink supplying units depending on the materials constituting the heads and units, thereby causing problems such that the properties of the ink are changed; the ink is leaked from the recording heads and the ink supplying units; and the ink is defectively ejected from the recording heads.

When a pigment is used as the colorant of the ink, it is relatively preferable to add a pH controlling agent in combination with a dispersant when the pigment is dispersed in water compared to a case in which after the pigment is dispersed, a pH controlling agent is added thereto in combination with additives such as wetting agents, and penetrants. This is because there is a case in which the pH controlling agent agglomerates the pigment dispersion depending on the property of the pH controlling agent.

Suitable materials for use as the pH controlling agent include alcohol amines, hydroxides of alkali metals, ammonium hydroxides, phosphonium hydroxides, and carbonates of alkali metals. These compounds can be used alone or in combination.

Specific examples of the alcohol amines include diethanolamine, triethanolamine, and 2-amino-2-ethyl-1,3-propanediol.

Specific examples of the hydroxides of alkali metals include lithium hydroxide, sodium hydroxide, and potassium hydroxide.

Specific examples of the ammonium hydroxides include ammonium hydroxide, and quaternary ammonium hydroxide.

Specific examples of the phosphonium hydroxides include quaternary phosphonium hydroxide.

Specific examples of the carbonates of alkali metals include lithium carbonate, sodium carbonate, and potassium carbonate.

Specific examples of the antiseptics/fungicides include sodium dehydroacetate, sodium sorbate, sodium salt of 2-pilidinethiol-1-oxide, sodium benzoate, and sodium salt of pentachlorophenol.

Specific examples of the antirusts include acidic sulfites, sodium thiosulfate, ammonium thioglycolate, diisopropylammonium nitrite, pentaerythritol tetranitrate, and dicyclohexylammonium nitrite.

Specific examples of the chelating agents include sodium salt of ethylenediamine tetraacetic acid, sodium salt of nitrilotriacetic acid, sodium salt of hydroxyethylethylenediaminetriacetic acid, sodium salt of diethylenetriaminepentaacetic acid, and sodium salt of uramildiacetic acid.

The ink can be prepared by a known method. For example, ink components such as a colorant, a wetting agent, a surfactant, and water, and other optional components such as a penetrant, an aqueous resin dispersion, and other components are subjected to dispersing/dissolving while agitated if desired. The dispersing treatment is performed using a mixer such as a sand mill, a homogenizer, a ball mill, a paint shaker, and a supersonic dispersing machine, and the agitation is performed by an agitator having an agitating blade, a magnetic stirrer, and a high speed dispersing machine.

The property of the ink is not particularly limited, and is properly determined so that the ink can be satisfactorily used for the target image forming apparatuses. However, the ink preferably has a viscosity of from 5 to 15 mPa·s at 25° C. When the ink has a viscosity of not less than 5 mPa·s, effects to improve image density and character image quality can be produced. In addition, when the ink has a viscosity of not greater than 15 mPa·s, the ink has good ejection stability. In this regard, the viscosity is measured at 25° C. using a viscometer such as RL-500 from Toki Sangyo Co., Ltd.

The ink preferably has a surface tension of not greater than 35 mN/m at 25° C., and more preferably not greater than 32 mN/m. When the surface tension is not greater than 35 mN/m, problems such that the ink on a recording medium causes beading (i.e., a phenomenon such that adjacent ink dot images are connected with each other), and it takes time until the ink on a recording medium dries are not caused.

The color of the ink is not particularly limited, and is properly determined depending on the purpose of the ink. For example, yellow, magenta, cyan and black color inks are used. By using an ink set including two or more of these color inks, multi-color images can be formed. By using an ink set including these four color inks, full color images can be formed.

The ink can be used for any inkjet printers having an inkjet recording head. Specific examples of such printers include the following:

(1) Piezoelectric inkjet printers (such as a printer disclosed by JP-H02-51734-A), in which a piezoelectric device is used as a pressure generating device to press an ink in an ink passage, and a vibrating plate forming a wall of the ink passage is deformed by the piezoelectric device to change the volume of the ink passage to eject ink droplets from the ink passage, thereby forming an ink image on a recording medium;

(2) Thermal inkjet printers (such as a printer disclosed by JP-S61-59911-A), in which an ink in an ink passage is heated by heating a resistor to form an air bubble in the ink passage, thereby ejecting ink droplets from the ink passage, resulting in formation of an ink image on a recording medium; and (3) Electrostatic inkjet printers (such as a printer disclosed by JP-1106-71882-A), in which an electrostatic force is formed between a vibrating plate and an electrode opposed to the vibrating plate to deform the vibrating plate and to change the volume of the ink passage, thereby ejecting ink droplets from the ink passage, resulting in formation of an ink image on a recording medium.

The ink of this disclosure can be used as inkjet ink, ink for fountain pens, ballpoint pens, magic markers, and marking pens, and is particularly preferably used for image forming apparatuses (such as printers) using an inkjet recording method. For example, the ink can be used for a printer in which a recording medium and an ink are heated to a temperature of from 50 to 200° C. before or after an image is formed to fix the image, or the image forming apparatus of this disclosure. In addition, the ink can also be preferably used for forming a print of this disclosure.

Next, the recording medium on which an image of the ink of this disclosure is formed will be described.

Plain papers having no coated layer are preferably used as the recording medium. Specifically, plain papers for use as copy papers, which have a sizing degree of not less than 10 seconds, and an air permeability of from 5 to 50 seconds, are preferable.

Next, the ink cartridge of this disclosure will be described.

The ink cartridge of this disclosure includes a container in which the ink of this disclosure is contained, and optionally includes other members.

The container is not particularly limited, and the shape, structure, dimension and constitutional materials of the container are properly determined depending on the purpose of the ink cartridge. For example, ink bags made of an aluminum-laminated film, or a resin film can be preferably used.

Figure 2:
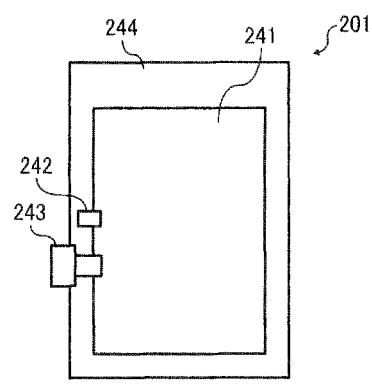
FIG. 2 is a schematic view illustrating a modified version of the ink cartridge illustrated in FIG. 1.

The ink cartridge will be described by reference to FIGS. 1 and 2. FIG. 1 is a schematic view illustrating an ink cartridge according to an embodiment, and FIG. 2 is a schematic view illustrating a modified version of the ink cartridge illustrated in FIG. 1.

As illustrated in FIG. 1, the ink of this disclosure is fed into an ink bag 241 (serving as a container) of an ink cartridge 201 from an ink inlet 242. After discharging air from the ink bag 241, the ink inlet 242 is closed by welding or the like. When the ink cartridge 201 is used, the ink cartridge 201 is set in an inkjet printer 101 (illustrated in FIG. 3) so that a needle of the inkjet printer is inserted into an ink outlet 243 of the ink cartridge 201, and therefore the ink in the ink bag 241 is supplied to a main body of the printer 101. The ink bag 241 is typically made of a material having low permeability to gas such as wrapping materials (e.g., aluminum-laminated films). The ink bag 241 is contained in a cartridge case 244 (illustrated in FIG. 2) typically made of a plastic. The resultant ink cartridge 201 is typically used by being detachably attached to an image forming apparatus, preferably the inkjet recording apparatus of this disclosure mentioned later.

When an image is formed using the ink of this disclosure, an ink ejecting process is performed in which stimulus (energy) is applied to the ink in an inkjet recording head so that the ink is ejected from the recording head toward a recoding medium to form the image on the recording medium. In this regard, in order to form images having a high image density without image blurring, and soiling of the backside of the recording medium, a pretreatment liquid applying process in which a pretreatment liquid is applied to the recording medium before the ink ejecting process, and/or an aftertreatment liquid applying process in which a aftertreatment liquid is applied to the recording medium after the ink ejecting process can be performed.

Initially, the ink ejecting process and the ink ejecting device will be described.

In the ink ejecting process, stimulus (energy) is applied to the ink to eject the ink, so that the ejected ink flies and is adhered to a surface of a recording medium, thereby forming an ink image on the recording medium.

The ink ejecting device (i.e., inkjet recording head) applies stimulus (energy) to the ink to eject the ink toward a recording medium, thereby forming an ink image on the recording medium. The ink ejecting device is not particularly limited, and for example, inkjet nozzles can be used as the ink ejecting device. In the ink ejecting device of the inkjet recording apparatus of this disclosure, at least part of the liquid chamber, the fluid resistant portion, the vibrating plate and the nozzles is preferably made of a material including at least one of silicon or nickel. In addition, the nozzles preferably have a diameter of not greater than 30 µm, and more preferably from 1 µm to 20 µm.

The above-mentioned stimulus (energy) is generated by a stimulus generator. The stimulus is not particularly limited, and is determined depending on the purpose of the ink ejecting device. For example, heat (temperature), pressure, vibration and light can be used as the stimulus. These can be used alone or in combination. Among these, heat and pressure are preferable.

Suitable devices for use as the stimulus generator include heaters, pressing devices, piezoelectric devices, vibration generators, ultrasonic oscillators, and lights. Specific examples thereof include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

The manner of ink ejection is not particularly limited, and changes depending on the stimulus applied. For example, when the stimulus is heat, a method in which heat energy is applied to the ink in an inkjet recording head according to image information signals using a thermal head or the like to form a bubble in the ink, thereby ejecting the ink in the recording head from a nozzle by the pressure of the bubble can be used. When the stimulus is pressure, a method in which a voltage is applied to a piezoelectric element adhered to a pressure chamber present its an ink flow path in an inkjet recording head to bend the piezoelectric element, thereby decreasing the volume of the pressure chamber, resulting in ejection of the inkjet ink from a nozzle of the recording head can be used.

The volume of an inkjet ink droplet ejected from a nozzle is generally from $3 \times 10^{-15}$ to $40 \times 10^{-15}$ m$^3$ (i.e., 3 to 40 µl). The speed of an ejected ink droplet is generally from 5 to 20 m/s. The drive frequency is generally not less than 1 kHz. The resolution of images recorded by ejected ink droplets is generally not less than 300 dpi (dots per inch).

The above-mentioned stimulus generators are controlled by a controller. The controller is not particularly limited, and for example, a device such as sequencers and computers is used.

Next, the inkjet recording apparatus of this disclosure will be described by reference to a serial inkjet recording apparatus.

Figure 3:
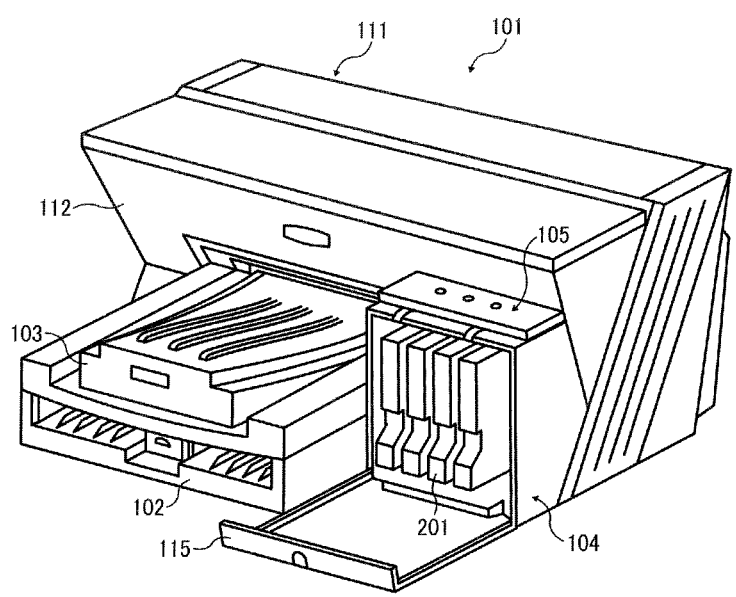
FIG. 3 is a schematic perspective view illustrating a serial inkjet recording apparatus as an inkjet recording apparatus according to an embodiment.

FIG. 3 is a schematic perspective view illustrating a serial inkjet recording apparatus as an inkjet recording apparatus according to an embodiment.

The inkjet recording apparatus illustrated in FIG. 3 includes a main body 101 thereof, a recording sheet feed tray 102, which is attached to the main body 101 and on which a stack of recording sheets is set, a copy tray 103, which is attached to the main body 101 and on which recording sheets bearing ink images thereon are stacked, and an ink cartridge setting portion 104 to which ink cartridges 201 are detachably attached. On the upper surface of the ink cartridge setting portion 104, an operating portion 105 including operation keys, a display, etc. is arranged. The ink cartridge setting portion 104 has a front cover 115 which is openable and closable so that the ink cartridges 201 can be attached to the ink cartridge setting portion 104 or detached therefrom. Numerals 111 and 112 respectively denote an upper cover of the inkjet recording apparatus, and a front cover of the apparatus.

Figure 4:
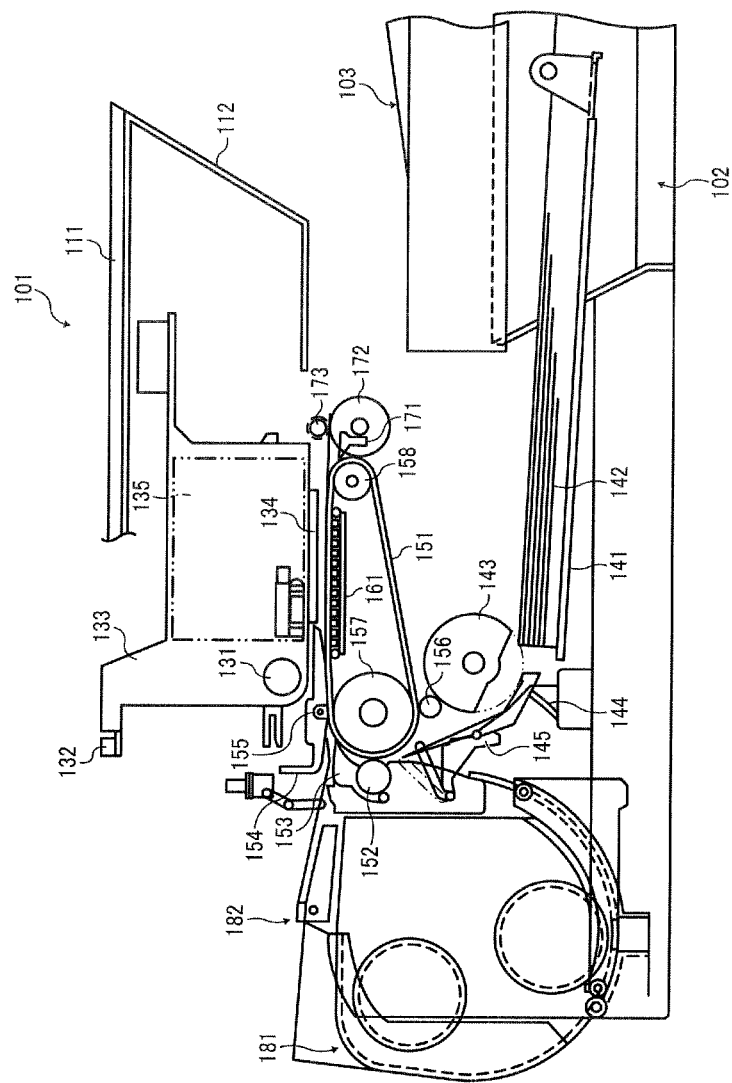
FIG. 4 is a schematic side view illustrating the internal configuration of the serial inkjet recording apparatus.
Figure 5:
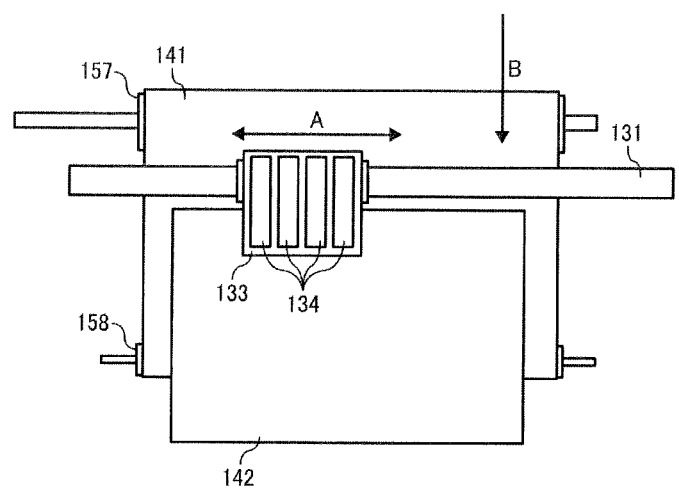
FIG. 5 is a schematic plan view illustrating the printing section of the serial inkjet recording apparatus.

As illustrated in FIGS. 4 and 5, a carriage 133 is slidably supported by a guide rod 131 and a stay 132, which are supported by both side plates (not shown) of the main body 101, so that the carriage 133 is moved in a main scanning direction (A) by a main scanning motor (not shown) to perform a scanning operation (i.e., an image forming operation).

An inkjet recording head 134 including four inkjet recording heads, each of which has multiple nozzles arranged in a direction perpendicular to the main scanning direction (A) to eject droplets of yellow (Y), magenta (M), cyan (C) or black (K) inkjet ink downward, is provided on the carriage 133.

Each of the four inkjet recording heads 134 includes an energy generator to eject ink droplets. Specific examples of the energy generator include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

In addition, sub-tanks 135 containing the color inkjet inks to supply the color inkjet inks to the respective recording heads 134 are provided on the carriage 133. The color inkjet inks in the ink cartridges 201 set to the ink cartridge setting portion 104 are supplied to the respective sub-tanks 135 via respective ink supplying tubes (not shown).

The inkjet recording apparatus includes a recording sheet supplier to feed recording sheets 142 set on a sheet loading portion (pressing plate) 141. The recording sheet supplier includes a sheet feeding roller 143 to feed the recording sheets 142, and a separation pad 144, which faces the sheet feeding roller 143 while being biased toward the sheet feeding roller 143 and which is made of a material having a high friction coefficient, to feed the recording sheets 142 one by one from the sheet loading portion 141.

The inkjet recording apparatus further includes a feeder to feed the recording sheet 142, which is fed from the recording sheet supplier, toward the image recording area located below the inkjet recording head 134. The feeder includes a feeding belt 151 to feed the recording sheet 142 while electrostatically attracting the recording sheet, a counter roller 152 to feed the recording sheet 142, which is fed from the recording sheet supplier along a guide 145, while sandwiching the recording sheet 142 with the feeding belt 151, a direction changing guide 153 to change the direction of the recording sheet 142, which is fed substantially vertically, at an angle of about 90° so that the recording sheet 142 is contacted with the feeding belt 151 so as to be fed thereby, a pressing roller 155 which is biased toward the feeding belt 151 by a pressing member 154, and a charging roller 156 to charge the surface of the feeding belt 151.

The feeding belt 151 is an endless belt, which is tightly stretched by a feeding roller 157 and a tension roller 158 so as to be rotated in a recording sheet feeding direction (i.e., a sub-scanning direction (B)) perpendicular to the main scanning direction (A). For example, the feeding belt 151 includes a first layer (i.e., an uppermost layer), which electrostatically attracts the recording sheet 142 and which is made of a resin layer (such as a tetrafluoroethylene-ethylene copolymer (ETFE) whose electric resistance is not controlled) with a thickness of about 40 µm, and a second layer (i.e., a medium resistance layer or a grounding layer), which is made of almost the same material as that of the first layer except that carbon black is included therein so that the second layer has a medium electric resistance.

In addition, a guide member 161 is arranged below the feeding belt 151 so as to face the image recording area in which an image is recorded on the recording sheet 142 by the inkjet recording head 134.

The inkjet recording apparatus further includes a sheet discharger to discharge the recording sheet 142, which bears an image recorded by the inkjet recording head 134, from the main body 101. The sheet discharger includes a separation pick 171 to separate the recording sheet 142 from the feeding belt 151, and discharging rollers 172 and 173 to discharge the recording sheet 142 toward the copy tray 103 located below the discharging roller 172.

A duplex copy unit 181 is detachably attached to the backside of the main body 101 of the inkjet recording apparatus. The duplex copy unit 181 receives the recording sheet 142, which is fed to the duplex copy unit 181 by reversely rotating the feeding belt 151, and feeds again the recording sheet 142 to the nip between the counter roller 152 and the feeding belt 151 so that another image is formed on the backside of the recording sheet 142 by the inkjet recording heads 134 in the image recording area.

A manual sheet feeder 182, by which a recording sheet can be manually fed to the inkjet recording apparatus, is provided above the duplex copy unit 181.

Next, the image forming operation of the inkjet recording apparatus will be described.

The recording sheet 142 is supplied one by one by the recording material supplier. The recording sheet 142 thus fed in substantially the vertical direction is guided by the guide 145 to the nip between the feeding belt 151 and the counter roller 152 so as to be fed by the feeding belt 151 and the counter roller 152. Further, the recording sheet 142 is guided by the direction changing guide 153 so that the direction of the sheet is changed at an angle of about 90°. The recording sheet 142 is then fed by the feeding belt 151 while pressed toward the feeding belt 151 by the pressing roller 155.

In this regard, since the feeding belt 151 is charged by the charging roller 156, the recording sheet 142 is fed by the feeding belt 151 while electrostatically adhered thereto. Next, the carriage 133 is moved in the main scanning direction (A) while the inkjet recording head 134 is driven according to image signals so as to eject droplets of the color inkjet inks to form one line image on the surface of the recording sheet 142, which is stopped in the image forming operation. After recording one line image, the recording sheet 142 is fed in a predetermined length in the sub-scanning direction (B), and the next image forming operation is performed to form another one line image on the surface of the recording material sheet 142. By repeating the image forming operation, an image is formed on the surface of the recording material sheet 142. When the inkjet recording apparatus receives a signal such that the image recording operation is completed or the rear edge of the recording sheet 142 reaches the image recording area, the inkjet recording apparatus stops the image forming operation, and the sheet discharger discharges the recording sheet 142 bearing the image thereon to the copy tray 103.

When it is detected that the inkjet ink in the sub tank 135 is substantially exhausted (i.e., near-end of ink is detected), a predetermined amount of ink is supplied to the sub tank 135 from the corresponding ink cartridge 201.

When the inkjet ink in the ink cartridge 201 is exhausted, it is possible that after the ink cartridge is disassembled, the ink bag in the ink cartridge is replaced with a new ink bag, and then the ink cartridge 201 is assembled again to be attached to the inkjet recording apparatus. Even when the ink cartridge 201 is set so as to be vertical from a front side of the inkjet recording apparatus as illustrated in FIG. 3, the ink in the ink cartridge 201 can be stably supplied to the corresponding sub tank 135. Therefore, even when the ink cartridge cannot be set from die upper side of the main body 101 of the inkjet recording apparatus due to space limitation (for example, in a case where the apparatus is set in a rack or an object is set on the upper surface of the apparatus), the ink cartridge 201 can be easily replaced.

Hereinbefore, the inkjet recording apparatus of this disclosure has been described by reference to a serial (shuttle-type) inkjet recording apparatus in which a carriage is scanned in the main scanning direction (A). However, the inkjet recording apparatus is not limited thereto, and can include a line inkjet recording apparatus using a line-type inkjet recording head.

In addition, the inkjet recording apparatus of this disclosure can be used for image forming apparatuses using an inkjet recording method, such as inkjet recording printers, facsimiles, copiers, and multi-functional products having functions of printer, facsimile and copier.

Next, the print formed using the ink of this disclosure will be described.

The ink of this disclosure can form a print in which an image of the ink is formed on a recording medium serving as a support. The recording medium is not particularly limited. Specific examples of the recording medium include papers such as plain papers, gloss papers, and general-purpose printing papers.

The print of this disclosure has high image quality, and good preservation stability. Therefore, the print can be used for various purposes such as archival documents.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Preparation Example 1

Preparation of Dispersion of Surface-Treated Self-Dispersible Carbon Black

Ninety (90) grams of a carbon black having a CTAB specific surface area of 150 $m^2/g$, and a DBP oil absorption of 100 ml/100 g was added to 3,000 ml of a 2.5N aqueous solution of sodium sulfate, and the mixture was heated to 60° C. while agitated for 10 hours by an agitator rotated at a speed of 300 rpm to perform a reaction. The reaction product was filtered, and the obtained carbon black was mixed with an aqueous solution of sodium hydroxide to neutralize the carbon black, followed by ultrafiltration. The thus obtained carbon black was washed with water and then dried. The carbon black was dispersed in pure water at a concentration of 20% by weight.

Preparation Example 2

Preparation of Dispersion of Surface-Treated Self-Dispersible Yellow Pigment

A yellow pigment, C.I. Pigment Yellow 128, was subjected to a low-temperature plasma treatment to incorporate a carboxylic acid group into the pigment. The thus prepared yellow pigment was dispersed in ion-exchange water, and the dispersion was subjected to desalination/condensation using an ultrafiltration membrane to prepare a yellow pigment dispersion having a pigment content of 15% by weight.

Preparation Example 3

Preparation of Dispersion of Surface-Treated Self-Dispersible Magenta Pigment

The procedure for preparation of the yellow pigment dispersion in Preparation Example 2 was repeated except that the yellow pigment was replaced with a magenta pigment, C.I. Pigment Red 122, to prepare a magenta pigment dispersion having a pigment content of 15% by weight.

Preparation Example 4

Preparation of Dispersion of Surface-Treated Self-Dispersible Cyan Pigment

The procedure for preparation of the yellow pigment dispersion in Preparation Example 2 was repeated except that the yellow pigment was replaced with a cyan pigment, C.I. Pigment Blue 15:3, to prepare a cyan pigment dispersion having a pigment content of 15% by weight.

Synthesis Example 1

Preparation of Polymer Solution

After air inside a 1-liter flask, which is equipped with a mechanical agitator, a thermometer, a nitrogen gas feed pipe, a reflux tube, and a dropping funnel, was substituted with a nitrogen gas, the following components were fed thereto to prepare a mixture.

| | |
|---|---|
| Styrene | 11.2 g |
| Acrylic acid | 2.8 g |
| Lauryl methacrylate | 12.0 g |
| Polyethylene glycol methacrylate | 4.0 g |
| Styrene macromer | 4.0 g |
| (AS-6 from Toa Gosei Chemical Industry Co., Ltd.) | |
| Mercaptoethanol | 0.4 g |

The mixture was heated to 65° C.

Next, the following components were mixed and the mixture was dropped into the flask over 2.5 hours using the dropping funnel.

| | |
|---|---|
| Styrene | 100.8 g |
| Acrylic acid | 25.2 g |
| Lauryl methacrylate | 108.0 g |
| Polyethylene glycol methacrylate | 36.0 g |
| Hydroxyethyl methacrylate | 60.0 g |
| Styrene macromer | 36.0 g |
| (AS-6 from Toa Gosei Chemical Industry Co., Ltd.) | |
| Mercaptoethanol | 3.6 g |
| Azobisdimethylvaleronitrile | 2.4 g |
| Methyl ethyl ketone | 18.0 g |

Thereafter, a mixture of 0.8 g of azobisdimethylvaleronitrile and 18.0 g of methyl ethyl ketone was dropped into the flask over 0.5 hours using the dropping funnel.

After the reaction product in the flask was aged for 1 hour at 65° C., 0.8 g of azobisdimethylvaleronitrile was fed into the flask, and the mixture was further aged for 1 hour. Thereafter, 364.0 g of methyl ethyl ketone was fed into the flask.

Thus, 800 g of a polymer solution having a solid content of 50% by weight was prepared.

Preparation Example 5

Preparation of Dispersion of Particulate Polymer Including Phthalocyanine Pigment The following components were mixed by agitation.

| | |
|---|---|
| Polymer solution prepared above | 28 g |
| Phthalocyanine pigment | 26 g |
| 1 Mole/L aqueous solution of potassium hydroxide | 13.6 g |
| Methyl ethyl ketone | 20 g |
| Ion exchange water | 30 g |

The mixture was kneaded using a triple roll mill. The thus prepared paste was fed into 200 g of ion exchange water, and the mixture was fully agitated. Thereafter, methyl ethyl ketone and water were distilled away from the mixture using an evaporator to prepare a dispersion of a cyan-colored particulate polymer.

Preparation Example 6

Preparation of Dispersion of Particulate Polymer Including Dimethylquinacridone Pigment The procedure for preparation of the cyan-colored particulate polymer dispersion in Preparation Example 5 was repeated except that the pigment was replaced with Pigment Red 122 to prepare a dispersion of a magenta-colored particulate polymer.

Preparation Example 7

Preparation of Dispersion of Particulate Polymer Including Monoazoyellow Pigment The procedure for preparation of the cyan-colored particulate polymer dispersion in Preparation Example 5 was repeated except that the pigment was replaced with Pigment Yellow 74 to prepare a dispersion of a yellow-colored particulate polymer.

Preparation Example 8

Preparation of Dispersion of Particulate Polymer Including Carbon Black

The procedure for preparation of the cyan-colored particulate polymer dispersion in Preparation Example 5 was repeated except that the pigment was replaced with a carbon black to prepare a dispersion of a black-colored particulate polymer.

Examples 1 to 30 and Comparative Examples 1 to 10

Compositions were prepared according to the formulations described in Tables 1 to 8. After the pH of each of the compositions was adjusted so as to be 9 using a 10% by weight aqueous solution of lithium hydroxide, the composition was filtered using a 0.8 μm membrane filter. Thus, inks of Examples 1 to 30 and Comparative Examples 1 to 10 were prepared. In Tables 1 to 8, the units of the numbers are percent by weight.

TABLE 1

| Components (% by weight) | | Ex. 1 | Ex. 2 | Ex. 3 | Ex. 4 | Ex. 5 |
|---|---|---|---|---|---|---|
| Pigment dispersion (weight of solid component) | Preparation Ex. 1 (Black) | 7 | 7 | 7 | 7 | 7 |
| | Preparation Ex. 2 (Yellow) | — | — | — | — | — |
| | Preparation Ex. 3 (Magenta) | — | — | — | — | — |
| | Preparation Ex. 4 (Cyan) | — | — | — | — | — |
| | Preparation Ex. 6 (Magenta) | — | — | — | — | — |
| | Preparation Ex. 7 (Yellow) | — | — | — | — | — |
| | Preparation Ex. 5 (Cyan) | — | — | — | — | — |
| | Preparation Ex. 8 (Black) | — | — | — | — | — |
| Resin dispersion (weight of solid component) | Acrylic-silicone emulsion | 2 | 2 | — | — | 2 |
| | Polyurethane resin emulsion | — | — | 2 | 2 | — |
| Water-soluble organic material | Glycerin | 15 | 15 | — | 15 | — |
| | 1,3-butanediol | — | — | 15 | — | 15 |
| | Diethylene glycol monoisobutyl ether | 10 | 10 | 10 | 10 | — |
| | Dipropylene glycol monoisobutyl ether | — | — | — | — | 10 |
| | 1,3-dimethyl-2-imidazolidinone | 5 | — | 5 | 5 | — |
| | β-methoxy-N,N-dimethyl propionamide | — | 5 | — | — | — |
| | 2-pyrrolidone | — | — | — | — | 8 |

TABLE 1-continued

| Components (% by weight) | | Ex. 1 | Ex. 2 | Ex. 3 | Ex. 4 | Ex. 5 |
|---|---|---|---|---|---|---|
| Water-soluble organic material having formula (1) | Triisopropylene glycol | — | — | — | — | 10 |
| | Triisopropylene glycol monomethyl ether | 10 | — | — | — | — |
| | Triisopropylene glycol monoethyl ether | — | — | — | — | — |
| | Triisopropylene glycol monoisopropyl ether | — | 10 | — | — | — |
| | Diisopropylene glycol monoisopropyl ether | — | — | — | — | — |
| | Polyisopropylene glycol | — | — | 10 | — | — |
| | Polyisopropylene glycol (2) | — | — | — | 10 | — |
| Surfactant | ZONYL FS-300 | 1.0 | 1.0 | 1.0 | 1.0 | — |
| | DSN403N | — | — | — | — | 0.2 |
| | MEGAFACE F444 | — | — | — | — | — |
| Penetrant | 2-ethyl-1,3-hexanediol | 2 | 2 | 2 | 2 | 2 |
| | 2,2,4-trimethyl-1,3-pentanediol | — | — | — | — | — |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 43.15 | 43.15 | 43.15 | 43.15 | 45.35 |

TABLE 2

| Components (% by weight) | | Ex. 6 | Ex. 7 | Ex. 8 | Ex. 9 | Ex. 10 |
|---|---|---|---|---|---|---|
| Pigment dispersion (weight of solid component) | Preparation Ex. 1 (Black) | 7 | 7 | 7 | 7 | — |
| | Preparation Ex. 2 (Yellow) | — | — | — | — | — |
| | Preparation Ex. 3 (Magenta) | — | — | — | — | — |
| | Preparation Ex. 4 (Cyan) | — | — | — | — | — |
| | Preparation Ex. 6 (Magenta) | — | — | — | — | — |
| | Preparation Ex. 7 (Yellow) | — | — | — | — | — |
| | Preparation Ex. 5 (Cyan) | — | — | — | — | — |
| | Preparation Ex. 8 (Black) | — | — | — | — | 7 |
| Resin dispersion (weight of solid component) | Acrylic-silicone emulsion | 2 | 2 | 2 | — | — |
| | Polyurethane resin emulsion | — | — | — | 2 | 2 |
| Water-soluble organic material | Glycerin | 15 | 15 | — | 10 | 15 |
| | 1,3-butanediol | — | — | 15 | 8 | — |
| | Diethylene glycol monoisobutyl ether | 10 | 10 | 5 | — | — |
| | Dipropylene glycol monoisobutyl ether | — | — | — | 10 | 10 |
| | 1,3-dimethyl-2-imidazolidinone | — | 5 | 3 | 5 | 8 |

TABLE 2-continued

| Components (% by weight) | | Ex. 6 | Ex. 7 | Ex. 8 | Ex. 9 | Ex. 10 |
|---|---|---|---|---|---|---|
| | β-methoxy-N,N-dimethyl propionamide | 5 | — | 5 | — | — |
| | 2-pyrrolidone | — | — | — | — | — |
| Water-soluble organic material having formula (1) | Triisopropylene glycol | — | — | — | 10 | — |
| | Triisopropylene glycol monomethyl ether | — | 10 | 15 | — | — |
| | Triisopropylene glycol monoethyl ether | — | — | — | — | 10 |
| | Triisopropylene glycol monoisopropyl ether | — | — | — | — | — |
| | Diisopropylene glycol monoisopropyl ether | 10 | — | — | — | — |
| | Polyisopropylene glycol | — | — | — | — | — |
| | Polyisopropylene glycol(2) | — | — | — | — | — |
| Surfactant | ZONYL FS-300 | — | — | — | 0.1 | 0.1 |
| | DSN403N | 0.2 | 0.2 | — | — | — |
| | MEGAFACE F444 | — | — | 1.0 | — | — |
| Penetrant | 2-ethyl-1,3-hexanediol | 2 | — | 2 | 2 | — |
| | 2,2,4-trimethyl-1,3-pentanediol | — | — | — | — | 2 |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 42.35 | 40.35 | 46.15 | 45.25 | 45.25 |

TABLE 3

| Components (% by weight) | | Ex. 11 | Ex. 12 | Ex. 13 | Ex. 14 | Ex. 15 |
|---|---|---|---|---|---|---|
| Pigment dispersion (weight of solid component) | Preparation Ex. 1 (Black) | — | 7 | — | — | — |
| | Preparation Ex. 2 (Yellow) | — | — | 5 | — | — |
| | Preparation Ex. 3 (Magenta) | 7 | — | — | 7 | — |
| | Preparation Ex. 4 (Cyan) | — | — | — | — | 5 |
| | Preparation Ex. 6 (Magenta) | — | — | — | — | — |
| | Preparation Ex. 7 (Yellow) | — | — | — | — | — |
| | Preparation Ex. 5 (Cyan) | — | — | — | — | — |
| | Preparation Ex. 8 (Black) | — | — | — | — | — |
| Resin dispersion (weight of solid component) | Acrylic-silicone emulsion | 2 | 2 | — | — | 2 |
| | Polyurethane resin emulsion | — | — | 2 | 2 | — |
| Water-soluble organic material | Glycerin | — | 10 | 15 | 5 | — |
| | 1,3-butanediol | 15 | — | — | 10 | 15 |
| | Diethylene glycol monoisobutyl ether | — | 10 | 10 | 5 | — |

TABLE 3-continued

| Components (% by weight) | | Ex. 11 | Ex. 12 | Ex. 13 | Ex. 14 | Ex. 15 |
|---|---|---|---|---|---|---|
| | Dipropylene glycol monoisobutyl ether | 10 | — | — | 10 | 13 |
| | 1,3-dimethyl-2-imidazolidinone | 5 | — | — | 5 | — |
| | β-methoxy-N,N-dimethyl propionamide | — | 5 | — | — | 5 |
| | 2-pyrrolidone | — | — | 5 | — | — |
| Water-soluble organic material having formula (1) | Triisopropylene glycol | 10 | 20 | — | 10 | — |
| | Triisopropylene glycol monomethyl ether | — | — | 10 | — | — |
| | Triisopropylene glycol monoethyl ether | — | — | — | — | 10 |
| | Triisopropylene glycol monoisopropyl ether | — | — | — | — | — |
| | Diisopropylene glycol monoisopropyl ether | — | — | — | — | — |
| | Polyisopropylene glycol | — | — | 5 | — | — |
| | Polyisopropylene glycol (2) | — | — | — | — | — |
| Surfactant | ZONYL FS-300 | — | — | 1.0 | — | — |
| | DSN403N | 0.05 | 2.40 | — | 0.2 | — |
| | MEGAFACE F444 | — | — | — | — | 1.0 |
| Penetrant | 2-ethyl-1,3-hexanediol | — | — | — | — | 2 |
| | 2,2,4-trimethyl-1,3-pentanediol | 2 | 2 | 2 | 2 | — |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 42.2 | 49.55 | 48.15 | 47.35 | 46.15 |

TABLE 4

| Components (% by weight) | | Ex. 16 | Ex. 17 | Ex. 18 | Ex. 19 | Ex. 20 |
|---|---|---|---|---|---|---|
| Pigment dispersion (weight of solid component) | Preparation Ex. 1 (Black) | — | — | — | — | 7 |
| | Preparation Ex. 2 (Yellow) | — | — | — | — | — |
| | Preparation Ex. 3 (Magenta) | — | — | — | — | — |
| | Preparation Ex. 4 (Cyan) | — | — | — | — | — |
| | Preparation Ex. 6 (Magenta) | — | 7 | — | — | — |
| | Preparation Ex. 7 (Yellow) | — | — | 5 | — | — |
| | Preparation Ex. 5 (Cyan) | — | — | — | 5 | — |
| | Preparation Ex. 8 (Black) | 7 | — | — | — | — |
| Resin dispersion (weight of solid component) | Acrylic-silicone emulsion | 2 | — | — | 2 | — |
| | Polyurethane resin emulsion | — | 2 | 2 | — | — |

TABLE 4-continued

| Components (% by weight) | | Ex. 16 | Ex. 17 | Ex. 18 | Ex. 19 | Ex. 20 |
|---|---|---|---|---|---|---|
| Water-soluble organic material | Glycerin | 15 | 15ʻ | 5 | — | 15 |
| | 1,3-butanediol | — | — | 10 | 15 | — |
| | Diethylene glycol monoisobutyl ether | 10 | 10 | — | 10 | 10 |
| | Dipropylene glycol monoisobutyl ether | — | — | 10 | — | — |
| | 1,3-dimethyl-2-imidazolidinone | 5 | 5 | — | — | 5 |
| | β-methoxy-N,N-dimethyl propionamide | — | — | 5 | — | — |
| | 2-pyrrolidone | — | — | — | 5 | — |
| Water-soluble organic material having formula (1) | Triisopropylene glycol | — | — | — | 15 | — |
| | Triisopropylene glycol monomethyl ether | 10 | 10 | 15 | — | 10 |
| | Triisopropylene glycol monoethyl ether | — | — | — | — | — |
| | Triisopropylene glycol monoisopropyl ether | — | — | — | — | — |
| | Diisopropylene glycol monoisopropyl ether | — | — | — | — | — |
| | Polyisopropylene glycol | — | — | — | — | — |
| | Polyisopropylene glycol (2) | — | — | — | — | — |
| Surfactant | ZONYL FS-300 | 1.0 | — | — | 1.0 | 1.0 |
| | DSN403N | — | 0.2 | — | — | — |
| | MEGAFACE F444 | — | — | 1.0 | — | — |
| Penetrant | 2-ethyl-1,3-hexanediol | 2 | 2 | 2 | — | — |
| | 2,2,4-trimethyl-1,3-pentanediol | — | — | — | 2 | 2 |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 43.15 | 42.35 | 48.15 | 48.15 | 43.15 |

TABLE 5

| Components (% by weight) | | Ex. 21 | Ex. 22 | Ex. 23 | Ex. 24 | Ex. 25 |
|---|---|---|---|---|---|---|
| Pigment dispersion (weight of solid component) | Preparation Ex. 1 (Black) | 7 | 7 | 7 | 7 | 7 |
| | Preparation Ex. 2 (Yellow) | — | — | — | — | — |
| | Preparation Ex. 3 (Magenta) | — | — | — | — | — |
| | Preparation Ex. 4 (Cyan) | — | — | — | — | — |
| | Preparation Ex. 6 (Magenta) | — | — | — | — | — |
| | Preparation Ex. 7 (Yellow) | — | — | — | — | — |
| | Preparation Ex. 5 (Cyan) | — | — | — | — | — |
| | Preparation Ex. 8 (Black) | — | — | — | — | — |

TABLE 5-continued

| Components (% by weight) | | Ex. 21 | Ex. 22 | Ex. 23 | Ex. 24 | Ex. 25 |
|---|---|---|---|---|---|---|
| Resin dispersion (weight of solid component) | Acrylic-silicone emulsion | — | 2 | — | 2 | — |
| | Polyurethane resin emulsion | 2 | — | 2 | — | 2 |
| Water-soluble organic material | Glycerin | 5 | — | — | 5 | 10 |
| | 1,3-butanediol | 10 | — | — | 10 | 5 |
| | Diethylene glycol monoisobutyl ether | — | 10 | — | 10 | 5 |
| | Dipropylene glycol monoisobutyl ether | — | — | 5 | — | 5 |
| | 1,3-dimethyl-2-imidazolidinone | — | — | — | 3 | — |
| | β-methoxy-N,N-dimethyl propionamide | 5 | — | 5 | 3 | 3 |
| | 2-pyrrolidone | — | 5 | — | — | 3 |
| Water-soluble organic material having formula (1) | Triisopropylene glycol | 10 | 10 | — | 5 | — |
| | Triisopropylene glycol monomethyl ether | — | 10 | 10 | 5 | 5 |
| | Triisopropylene glycol monoethyl ether | 10 | 8 | 10 | — | 5 |
| | Triisopropylene glycol monoisopropyl ether | — | — | 18 | — | — |
| | Diisopropylene glycol monoisopropyl ether | — | — | — | — | — |
| | Polyisopropylene glycol | — | — | — | — | — |
| | Polyisopropylene glycol (2) | — | — | — | — | — |
| Surfactant | ZONYL FS-300 | — | — | 1.0 | — | — |
| | DSN403N | 0.2 | — | — | 0.2 | — |
| | MEGAFACE F444 | — | 1.0 | — | — | 1.0 |
| Penetrant | 2-ethyl-1,3-hexanediol | 2 | — | — | — | 2 |
| | 2,2,4-trimethyl-1,3-pentanediol | — | 2 | — | 2 | — |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 42.35 | 46.15 | 49.15 | 43.35 | 44.15 |

TABLE 6

| Components (% by weight) | | Ex. 26 | Ex. 27 | Ex. 28 | Ex. 29 | Ex. 30 |
|---|---|---|---|---|---|---|
| Pigment dispersion (weight of solid component) | Preparation Ex. 1 (Black) | 7 | 7 | 7 | 7 | 7 |
| | Preparation Ex. 2 (Yellow) | — | — | — | — | — |
| | Preparation Ex. 3 (Magenta) | — | — | — | — | — |
| | Preparation Ex. 4 (Cyan) | — | — | — | — | — |
| | Preparation Ex. 6 (Magenta) | — | — | — | — | — |
| | Preparation Ex. 7 (Yellow) | — | — | — | — | — |

TABLE 6-continued

| Components (% by weight) | | Ex. 26 | Ex. 27 | Ex. 28 | Ex. 29 | Ex. 30 |
|---|---|---|---|---|---|---|
| | Preparation Ex. 5 (Cyan) | — | — | — | — | — |
| | Preparation Ex. 8 (Black) | — | — | — | — | — |
| Resin dispersion (weight of solid component) | Acrylic-silicone emulsion | 2 | — | — | — | 2 |
| | Polyurethane resin emulsion | — | 2 | — | 2 | — |
| Water-soluble organic material | Glycerin | 5 | — | — | — | — |
| | 1,3-butanediol | 10 | 15 | — | 9 | 5 |
| | Diethylene glycol monoisobutyl ether | — | — | — | 9 | 11 |
| | Dipropylene glycol monoisobutyl ether | 10 | — | — | 9 | 11 |
| | 1,3-dimethyl-2-imidazolidinone | 3 | 10 | 20 | — | 3 |
| | β-methoxy-N,N-dimethyl propionamide | — | 5 | 15 | 3 | 3 |
| | 2-pyrrolidone | 3 | 5 | — | 3 | — |
| Water-soluble organic material having formula (1) | Triisopropylene glycol | — | 5 | — | — | 5 |
| | Triisopropylene glycol monomethyl ether | — | — | 5 | 5 | 5 |
| | Triisopropylene glycol monoethyl ether | 5 | 5 | — | 5 | — |
| | Triisopropylene glycol monoisopropyl ether | 5 | — | 5 | — | — |
| | Diisopropylene glycol monoisopropyl ether | — | — | — | — | — |
| | Polyisopropylene glycol | — | — | — | — | — |
| | Polyisopropylene glycol (2) | — | — | — | — | — |
| Surfactant | ZONYL FS-300 | 1.0 | — | — | — | — |
| | DSN403N | — | 0.2 | 0.2 | 0.2 | 0.2 |
| | MEGAFACE F444 | — | — | — | — | — |
| Penetrant | 2-ethyl-1,3-hexanediol | — | 2 | — | 2 | 2 |
| | 2,2,4-trimethyl-1,3-pentanediol | 2 | — | 2 | — | — |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 44.15 | 47.35 | 47.35 | 45.35 | 45.35 |

TABLE 7

| Components (% by weight) | | Com. Ex. 1 | Com. Ex. 2 | Com. Ex. 3 | Com. Ex. 4 | Com. Ex. 5 |
|---|---|---|---|---|---|---|
| Pigment dispersion (weight of solid component) | Preparation Ex. 1 (Black) | 7 | 7 | 7 | 7 | — |
| | Preparation Ex. 2 (Yellow) | — | — | — | — | 5 |
| | Preparation Ex. 3 (Magenta) | — | — | — | — | — |
| | Preparation Ex. 4 (Cyan) | — | — | — | — | — |

TABLE 7-continued

| Components (% by weight) | | Com. Ex. 1 | Com. Ex. 2 | Com. Ex. 3 | Com. Ex. 4 | Com. Ex. 5 |
|---|---|---|---|---|---|---|
| | Preparation Ex. 6 (Magenta) | — | — | — | — | — |
| | Preparation Ex. 7 (Yellow) | — | — | — | — | — |
| | Preparation Ex. 5 (Cyan) | — | — | — | — | — |
| | Preparation Ex. 8 (Black) | — | — | — | — | — |
| Resin dispersion (weight of solid component) | Acrylic-silicone emulsion | 2 | — | — | 2 | 2 |
| | Polyurethane resin emulsion | — | 2 | 2 | — | — |
| Water-soluble organic material | Glycerin | 15 | 15 | — | 14 | 15 |
| | 1,3-butanediol | — | — | 10 | — | — |
| | Diethylene glycol monoisobutyl ether | 10 | 10 | 10 | 10 | 10 |
| | Dipropylene glycol monoisobutyl ether | — | — | — | — | — |
| | 1,3-dimethyl-2-imidazolidinone | 10 | — | 5 | 10 | 10 |
| | β-methoxy-N,N-dimethyl propionamide | — | 3 | — | — | — |
| | 2-pyrrolidone | — | — | — | — | — |
| Water-soluble organic material having formula (1) | Triisopropylene glycol | — | 15 | — | — | — |
| | Triisopropylene glycol monomethyl ether | 8 | — | 10 | 15 | 8 |
| | Triisopropylene glycol monoethyl ether | — | — | — | — | — |
| | Triisopropylene glycol monoisopropyl ether | — | — | — | — | — |
| | Diisopropylene glycol monoisopropyl ether | — | — | — | — | — |
| | Polyisopropylene glycol | — | — | — | — | — |
| | Polyisopropylene glycol (2) | — | — | — | — | — |
| Surfactant | ZONYL FS-300 | — | — | 1.0 | — | — |
| | DSN403N | 0.2 | — | — | 0.2 | — |
| | MEGAFACE F444 | — | 1.0 | — | — | 1.0 |
| Penetrant | 2-ethyl-1,3-hexanediol | — | — | — | 2 | 2 |
| | 2,2,4-trimethyl-1,3-pentanediol | 2 | 2 | 2 | — | — |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 45.35 | 46.15 | 38.15 | 51.35 | 46.15 |

TABLE 8

| Components (% by weight) | | Com. Ex. 6 | Com. Ex. 7 | Com. Ex. 8 | Com. Ex. 9 | Com. Ex. 10 |
|---|---|---|---|---|---|---|
| Pigment dispersion (weight of solid component) | Preparation Ex. 1 (Black) | — | — | 7 | 7 | 7 |
| | Preparation Ex. 2 (Yellow) | — | — | — | — | — |
| | Preparation Ex. 3 (Magenta) | 7 | — | — | — | — |
| | Preparation Ex. 4 (Cyan) | — | 5 | — | — | — |
| | Preparation Ex. 6 (Magenta) | — | — | — | — | — |
| | Preparation Ex. 7 (Yellow) | — | — | — | — | — |
| | Preparation Ex. 5 (Cyan) | — | — | — | — | — |
| | Preparation Ex. 8 (Black) | — | — | — | — | — |
| Resin dispersion (weight of solid component) | Acrylic-silicone emulsion | — | — | — | — | — |
| | Polyurethane resin emulsion | 2 | 2 | 2 | — | 2 |
| Water-soluble organic material | Glycerin | 8 | — | — | — | — |
| | 1,3-butanediol | — | 12 | — | — | — |
| | Diethylene glycol monoisobutyl ether | 10 | 15 | — | — | 5 |
| | Dipropylene glycol monoisobutyl ether | — | — | — | — | — |
| | 1,3-dimethyl-2-imidazolidinone | — | 7 | 5 | — | 5 |
| | β-methoxy-N,N-dimethyl propionamide | 5 | — | — | 20 | — |
| | 2-pyrrolidone | — | — | — | 17 | — |
| Water-soluble organic material having formula (1) | Triisopropylene glycol | 12 | — | 12 | — | — |
| | Triisopropylene glycol monomethyl ether | — | 15 | 20 | 5 | — |
| | Triisopropylene glycol monoethyl ether | — | — | 10 | — | 10 |
| | Triisopropylene glycol monoisopropyl ether | — | — | — | 5 | — |
| | Diisopropylene glycol monoisopropyl ether | — | — | — | — | — |
| | Polyisopropylene glycol | — | — | — | — | — |
| | Polyisopropylene glycol (2) | — | — | — | — | — |
| Surfactant | ZONYL FS-300 | 1.0 | — | — | — | 1.0 |
| | DSN403N | — | 0.2 | 0.2 | 0.2 | — |
| | MEGAFACE F444 | — | — | — | — | — |
| Penetrant | 2-ethyl-1,3-hexanediol | — | 2 | — | — | 2 |
| | 2,2,4-trimethyl-1,3-pentanediol | 2 | — | — | 2 | — |
| Fungicide | PROXEL GXL | 0.05 | 0.05 | 0.05 | 0.05 | 0.05 |
| Defoaming agent | KM-72F | 0.1 | 0.1 | 0.1 | 0.1 | 0.1 |
| Pure water | | Balance | Balance | Balance | Balance | Balance |
| Total (% by weight) | | 100 | 100 | 100 | 100 | 100 |
| Total amount of water-soluble materials | | 38.15 | 51.35 | 47.35 | 49.35 | 23.15 |

The details of the above-mentioned materials and the marketed products are as follows.
(1) Acrylic-silicone resin emulsion: POLYSOL ROY 6312 from Showa Highpolymer Co., Ltd. which has a solid content of 40% by weight, an average particle diameter of 171 nm, and a minimum film forming temperature (MFT) of 20° C.
(2) Polyurethane resin emulsion: HYDRAN APX-101H from DIC Corp. which has a solid content of 45% by weight, an average particle diameter of 160 nm, and a minimum film forming temperature (MET) of 20° C.
(3) Polyisopropylene glycol: Polyisopropylene glycol having a molecular weight of 250, and formula (1) in which R represents a hydrogen atom, and n is 4.
(4) Polyisopropylene glycol (2): Polyisopropylene glycol having a molecular weight of 400, and formula (1) in which R represents a hydrogen atom, and n is 7.
(5) ZONYL FS-300: Polyoxyethylene perfluoroalkyl ether from Du Pont which includes effective components in an amount of 40% by weight.
(6) DSN403N: Fluorine-containing surfactant from DAIKIN INDUSTRIES, ltd. which includes effective components in an amount of not less than 98% by weight.
(7) MEGAFACE F-444: Fluorine-containing surfactant from DIC Corporation which is a perfluoroalkyl group containing ethylene oxide adduct and which includes effective components in an amount of 100% by weight.
(8) PROXEL GXL: Fungicide from Avecia Ltd. which includes 1,2-benzoisothiazoline-3-one as a main component in an amount of 20% by weight and which includes dipropylene glycol.
(9) KM-72F: Self-emulsification type silicone deforming agent from Shin-Etsu Chemical Co., Ltd. which includes effective components in an amount of 100% by weight.

The inks of Examples 1-30 and Comparative Examples 1-30 were evaluated as follows.

I. Viscosity

The viscosity of an ink was measured with a viscometer RL-500 from Toki Sangyo Co., Ltd. at 25° C.

2. Dynamic Surface Tension

The dynamic surface tension of an ink was measured with a surface tensiometer SITA DYNOTESTER (from Sita Messtechnik GmbH) under conditions of 23±3° C. in temperature and 15 ms in measuring time (i.e., time from formation of bubbles to measurement of surface tension) using a maximum bubble pressure method.

3. Print Qualities

Each of the inks was ejected by an inkjet printer (IPSIO GXE-5500 from Ricoh Co., Ltd.) under environmental conditions of 23±0.5° C. and 50±5% RH to form Y, M, C and K square solid images on a recording medium. In this regard, the driving voltage of the piezoelectric element was changed so that the amounts of the ejected inks are equal, and therefore the inks are adhered to the recording medium in the same amounts. MY PAPER (high quality paper) from Ricoh Business Expert Co., Ltd., which has a weight of 69.6 g/m$^2$, a sizing degree of 23.2 sec and an air permeability of 21 sec was used as the recording medium. The square solid image pattern was prepared using Microsoft Word 2000, and the color setting conditions of the RGB color mode were as follows.
  Black square solid image: Red: 0, Green: 0, Blue: 0
  Yellow square solid image: Red: 255, Green: 255, Blue: 0
  Magenta square solid image: Red: 255, Green: 0, Blue: 255
  Cyan square solid image: Red: 0, Green: 0, Blue: 255

(1) Image Density

A color image of a chart including a 64 point solid square image, which was prepared using Microsoft Word 2000, was recorded on the recording paper mentioned above. In this regard, the print mode of the inkjet printer was set to a "plain paper-standard, high speed" mode using a driver attached to the printer, and the color matching function of the printer was not used.

The image density of the square solid image was measured with a spectrodensitometer X-RITE 938 from X-Rite Corp. The image density was graded as follows.
⊚ (Excellent): Not lower than 1.25 for black image
  Not lower than 0.80 for yellow image
  Not lower than 1.00 for magenta image
  Not lower than 1.05 for cyan image
○ (Good): Not lower than 1.15 and lower than 1.25 for black image
  Not lower than 0.75 and lower than 0.80 for yellow image
  Not lower than 0.95 and lower than 1.00 for magenta image
  Not lower than 0.95 and lower than 1.05 for cyan image
Δ (Acceptable): Not lower than 1.10 and lower than 1.15 for black image
  Not lower than 0.70 and lower than 0.75 for yellow image
  Not lower than 0.90 and lower than 0.95 for magenta image
  Not lower than 0.90 and lower than 0.95 for cyan image
X (Bad): Lower than 1.10 for black image
  Lower than 0.70 for yellow image
  Lower than 0.90 for magenta image
  Lower than 0.90 for cyan image (2) Offset Property of Image A color image of the chart was formed by the method used for the evaluation of image density. A cylindrical polyethylene roller having a diameter of 40 mm was rotated on the portion of the solid image having a length of 40 mm at a pressure of 5N. The optical density of a portion of the recording paper to which the solid image is re-transferred via the polyethylene roller was measured with the spectrodensitometer X-RITE 938 from X-Rite Corp. In this regard, the mode of the printer was set to s a "plain paper-standard, clear" mode, and the color matching function of the printer was not used.

The offset property was graded as follows.
○ (Good): Not lower than 0.1 and lower than 0.15
Δ (Acceptable): Not lower than 0.15 and lower than 0.2
X (Bad): Not lower than 0.2

(3) Fixability of Image

A color image of a chart including a square solid image with a size of 3 cm×3 cm, which was prepared using Microsoft Word 2000, was formed on the recording paper mentioned above.

After the image was dried for 24 hours under environmental conditions of 23±1° C. and 50±10% RH, the solid square image was rubbed back and forth five times (i.e., ten-time rubbing) with a cloth of cotton No. 3, which is defined in JIS L0803 and which is attached to a CM-1 type clock meter using a double-stick tape. The optical density of the cotton cloth was measured with the spectrodensitometer X-RITE 938 from X-Rite Corp. before and after the rubbing test to determine the difference between the optical density of the portion of the cotton cloth used for rubbing and the optical density of the cotton cloth before the rubbing test (i.e., background density of the cotton cloth). The fixability of image was graded as follows.
○ (Good): The optical density difference was not less than 0.05 and less than 0.1.
Δ (Acceptable): The optical density difference was not less than 0.1 and less than 0.2.
X (Bad): The optical density difference was not less than 0.2.

(4) Curl of Recording Paper after Image Formation

A square solid image having substantially the same size of the recording paper, which was prepared using Microsoft Word 2000, was formed on the recording paper. In this regard, the print mode of the printer was set to a "plain paper-standard, high speed" mode using a driver attached to the printer, and the color matching function was not used. The recording paper bearing the solid image was set on a flat table within 5 seconds after image formation in such a manner that the image faces the surface of the table, and the heights of four edge portions of the recording paper were measured with a scale to determine curl of the recording paper.

The curl was graded as follows.
○ (Good): The curl was not less than 30 mm and less than 40 mm.
Δ (Acceptable): The curl was not less than 40 min and less than 50 mm.
X (Bad): The curl was not less than 50 mm or the recording paper had a cylindrical form.

(5) Cockling

A square solid image having substantially the same size of the recording paper, which was prepared using Microsoft Word 2000, was formed on the recording paper. In this regard, the print mode of the printer was set to a "plain paper-standard, clear" mode using a driver attached to the printer, and the color matching function was not used.

The cockling was graded as follows.
◉ (Excellent): The recording paper bearing the solid image was not curled or waved.
○ (Good): The recording paper bearing the solid image was slightly waved but was hardly curled.
Δ (Acceptable): The recording paper bearing the solid image was waved (wrinkled), and the edges of the recording paper were slightly curved.
X (Bad): The recording paper bearing the solid image was curled so as to have a cylindrical form.

4. Ejection Stability of Ink

Two hundreds (200) copies of an A-4 size color image of a chart including square solid images and having an image area proportion of 5% was continuously formed using the recording paper mentioned above to determine whether or not the ink is stably ejected from the nozzles. In this regard, the print mode of the printer was set to a mode which is a "plain paper-standard, high speed" mode modified so as not to be subjected to color compensation using a driver attached to the printer.

The ejection stability of the ink was graded as follows.
○ (Good): The ink was ejected stably.
Δ (Acceptable): The ink was ejected slightly unstably.
X (Bad): The solid images had omissions formed due to non-ejection of the ink.

5. Preservability of Ink

Each ink was allowed to settle in a chamber heated to 70° c. for 2 weeks. The viscosity of the ink was measured before and after the preservation test to determine the change rate of the viscosity.

The preservability was graded as follows.
○ (Good): The viscosity change rate was less than 10%.
Δ (Acceptable): The viscosity change rate was not less than 10% and less than 20%
X (Bad): The viscosity change rate was not less than 20%.

The evaluation results are shown in Tables 9 and 10 below.

TABLE 9

|  | Viscosity (mPa·s) | Dynamic surface tension (mN/m) | Preservability of ink |
|---|---|---|---|
| Ex. 1 | 7.4 | 33.9 | ○ |
| Ex. 2 | 7.8 | 33.5 | ○ |
| Ex. 3 | 7.8 | 34.2 | ○ |
| Ex. 4 | 7.4 | 33.3 | ○ |
| Ex. 5 | 8.2 | 29.9 | ○ |
| Ex. 6 | 7.5 | 29.7 | ○ |
| Ex. 7 | 7.2 | 29.8 | ○ |
| Ex. 8 | 8.0 | 34.5 | ○ |
| Ex. 9 | 8.2 | 38.9 | ○ |
| Ex. 10 | 10.2 | 37.5 | Δ |
| Ex. 11 | 7.4 | 35.5 | ○ |
| Ex. 12 | 7.6 | 24.5 | ○ |
| Ex. 13 | 9.0 | 33.4 | ○ |
| Ex. 14 | 9.1 | 30.5 | ○ |
| Ex. 15 | 8.4 | 34.4 | ○ |
| Ex. 16 | 9.2 | 33.7 | Δ |
| Ex. 17 | 9.0 | 29.5 | Δ |
| Ex. 18 | 9.6 | 34.0 | Δ |
| Ex. 19 | 9.6 | 33.0 | Δ |
| Ex. 20 | 7.5 | 33.0 | ○ |
| Ex. 21 | 7.2 | 30.8 | ○ |
| Ex. 22 | 7.1 | 34.0 | ○ |
| Ex. 23 | 8.4 | 32.5 | ○ |
| Ex. 24 | 7.5 | 29.4 | ○ |
| Ex. 25 | 7.8 | 34.5 | ○ |
| Ex. 26 | 7.8 | 33.2 | ○ |
| Ex. 27 | 8.3 | 29.8 | ○ |
| Ex. 28 | 6.2 | 29.7 | ○ |
| Ex. 29 | 7.6 | 29.7 | ○ |
| Ex. 30 | 7.2 | 29.6 | ○ |
| Comp. Ex. 1 | 8.4 | 30.8 | ○ |
| Comp. Ex. 2 | 8.5 | 34.0 | ○ |
| Comp. Ex. 3 | 5.8 | 32.5 | ○ |
| Comp. Ex. 4 | 10.5 | 29.4 | ○ |
| Comp. Ex. 5 | 8.3 | 34.5 | ○ |
| Comp. Ex. 6 | 5.5 | 33.2 | ○ |
| Comp. Ex. 7 | 10.5 | 29.8 | ○ |
| Comp. Ex. 8 | 7.7 | 30.0 | ○ |
| Comp. Ex. 9 | 6.7 | 30.4 | ○ |
| Comp. Ex. 10 | 2.5 | 29.8 | ○ |

TABLE 10

|  | Image density | Offset | Fixability | Curl | Cockling | Ejection stability |
|---|---|---|---|---|---|---|
| Ex. 1 | ◉ | ○ | ○ | ○ | ◉ | ○ |
| Ex. 2 | ◉ | ○ | ○ | ○ | ◉ | ○ |
| Ex. 3 | ◉ | ○ | ○ | ○ | ◉ | ○ |
| Ex. 4 | ◉ | ○ | ○ | ○ | ◉ | ○ |
| Ex. 5 | ◉ | ○ | ○ | ○ | ◉ | ○ |
| Ex. 6 | ◉ | ○ | ○ | ○ | ◉ | ○ |
| Ex. 7 | ◉ | ○ | ○ | ○ | ◉ | ○ |
| Ex. 8 | ○ | ○ | ○ | ○ | ◉ | ○ |
| Ex. 9 | ○ | Δ | Δ | ○ | ◉ | ○ |
| Ex. 10 | ○ | Δ | Δ | ○ | ◉ | Δ |
| Ex. 11 | ○ | Δ | Δ | ○ | ◉ | ○ |
| Ex. 12 | ◉ | ○ | ○ | ○ | ◉ | Δ |
| Ex. 13 | ◉ | ○ | ○ | ○ | ◉ | ○ |
| Ex. 14 | ◉ | ○ | ○ | ○ | ◉ | ○ |
| Ex. 15 | ◉ | ○ | ○ | ○ | ◉ | ○ |
| Ex. 16 | ◉ | ○ | ○ | ○ | ◉ | Δ |
| Ex. 17 | ◉ | ○ | ○ | ○ | ◉ | Δ |
| Ex. 18 | ◉ | ○ | ○ | ○ | ◉ | Δ |
| Ex. 19 | ◉ | ○ | ○ | ○ | ◉ | Δ |
| Ex. 20 | ◉ | ○ | Δ | ○ | ◉ | ○ |
| Ex. 21 | ○ | ○ | ○ | ○ | ◉ | ○ |
| Ex. 22 | ◉ | ○ | ○ | ○ | ◉ | ○ |
| Ex. 23 | ○ | ○ | ○ | ○ | ◉ | ○ |
| Ex. 24 | ○ | ○ | ○ | ○ | ◉ | ○ |
| Ex. 25 | ◉ | ○ | ○ | ○ | ◉ | ○ |
| Ex. 26 | ◉ | ○ | ○ | ○ | ◉ | ○ |
| Ex. 27 | ◉ | ○ | ○ | ○ | ◉ | ○ |
| Ex. 28 | ○ | ○ | ○ | ○ | ◉ | ○ |
| Ex. 29 | ◉ | ○ | ○ | ○ | ◉ | ○ |
| Ex. 30 | ◉ | Δ | ○ | ○ | ◉ | ○ |

TABLE 10-continued

|  | Image density | Offset | Fixability | Curl | Cockling | Ejection stability |
|---|---|---|---|---|---|---|
| Comp. Ex. 1 | X | ○ | ○ | Δ | ○ | ○ |
| Comp. Ex. 2 | ○ | ○ | ○ | ○ | ⊚ | X |
| Comp. Ex. 3 | ⊚ | Δ | ○ | X | Δ | ○ |
| Comp. Ex. 4 | Δ | ○ | ○ | ○ | ⊚ | X |
| Comp. Ex. 5 | X | ○ | ○ | Δ | ○ | ○ |
| Comp. Ex. 6 | ⊚ | Δ | ○ | X | Δ | ○ |
| Comp. Ex. 7 | Δ | ○ | ○ | ○ | ⊚ | X |
| Comp. Ex. 8 | X | ○ | ○ | ○ | ⊚ | ○ |
| Comp. Ex. 9 | X | ○ | ○ | ○ | ⊚ | ○ |
| Comp. Ex. 10 | ○ | X | ○ | X | X | X |

It is clear from Tables 9 and 10 that the inkjet ink of this disclosure can high quality images without causing the curling and cockling problems even when images are formed on a plain paper.

Additional modifications and variations of the present invention are possible in light of the above teachings. It is therefore to be understood that within the scope of the appended claims the invention may be practiced other than as specifically described herein.

What is claimed is:

1. An inkjet ink comprising:
    water;
    a water-soluble organic material in an amount of from 40 to 50% by weight based on a total weight of the inkjet ink; and
    a colorant,
    wherein the water-soluble organic material includes at least one of 1,3-dimethyl-2-imidazolidinone, β-methoxy-N,N-dimethylpropionamide, and 2-pyrrolidone in an amount of from 5 to 35% by weight based on the total weight of the inkjet ink, and further includes a compound having the following formula (1) in an amount of from 10 to 40% by weight based on the total weight of the inkjet ink:

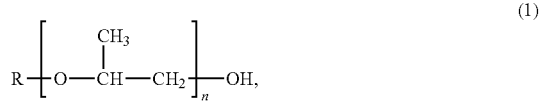

wherein R represents a hydrogen atom, or an alkyl group having 1 to 2 carbon atoms, and n is an integer of from 2 to 7.

2. The inkjet ink according to claim 1, wherein the inkjet ink has a dynamic surface tension of from 25 to 35 mN/m when the dynamic surface tension is measured by a maximum bubble pressure method under conditions of 23° C. in temperature and 15 ms in time ation of bubbles to measurement of the dynamic surface tension.

3. The inkjet ink according to claim 1, wherein the water-soluble organic material further includes at least one of diethylene glycol monoisobutyl ether, and dipropylene glycol monoisobutyl ether in an amount of from 5 to 3% by weight based on the total weight of the inkjet ink.

4. The inkjet ink according to claim 1, wherein the colorant is a self-dispersible pigment.

5. An ink cartridge comprising:
    a container; and
    the inkjet ink according to claim 1 contained in the container.

6. An inkjet recording apparatus comprising:
    the ink cartridge according to claim 5; and
    an inkjet recording head to eject the inkjet ink contained in the ink cartridge to form an ink image on a recording medium.

7. A print comprising:
    a support; and
    an ink image of the inkjet ink according to claim 1 located on the support.

* * * * *